(12) United States Patent
Chen et al.

(10) Patent No.: US 11,996,788 B2
(45) Date of Patent: May 28, 2024

(54) SINGLE STAGE BUCK-BOOST INVERTER WITH STEP MODULATION

(71) Applicants: Redx Technology Australia Pty Ltd, Helensvale (AU); Xue Jian Chen, Paradise Point (AU)

(72) Inventors: Xue Jian Chen, Paradise Point (AU); Jin Chuan Huang, Dongguan (CN)

(73) Assignee: Redx Technology Australia Pty Ltd, Helensvale (AU)

( * ) Notice: Subject to any disclaimer, the term of this patent is extended or adjusted under 35 U.S.C. 154(b) by 0 days.

(21) Appl. No.: 17/611,492

(22) PCT Filed: Sep. 15, 2021

(86) PCT No.: PCT/US2021/050550
§ 371 (c)(1),
(2) Date: Sep. 3, 2023

(87) PCT Pub. No.: WO2023/033840
PCT Pub. Date: Mar. 9, 2023

(65) Prior Publication Data
US 2024/0048072 A1 Feb. 8, 2024

Related U.S. Application Data

(60) Provisional application No. 63/240,367, filed on Sep. 3, 2021.

(51) Int. Cl.
*H02M 7/797* (2006.01)
*H02M 1/00* (2006.01)
*H02M 3/158* (2006.01)
*H02M 7/44* (2006.01)
*H02M 7/68* (2006.01)

(52) U.S. Cl.
CPC .......... *H02M 7/797* (2013.01); *H02M 1/007* (2021.05); *H02M 3/158* (2013.01); *H02M 7/44* (2013.01); *H02M 7/68* (2013.01)

(58) Field of Classification Search
CPC ...... H02M 1/007; H02M 3/158; H02M 7/797; H02M 7/44; H02M 7/68
See application file for complete search history.

(56) References Cited

U.S. PATENT DOCUMENTS

| | | | |
|---|---|---|---|
| 2017/0264228 A1* | 9/2017 | Kazuno | H02M 3/158 |
| 2019/0111909 A1* | 4/2019 | Shimizu | B60W 30/1843 |
| 2019/0111911 A1* | 4/2019 | Wang | B60W 20/14 |
| 2020/0235664 A1* | 7/2020 | Takei | H02M 7/537 |

* cited by examiner

Primary Examiner — Jue Zhang
(74) Attorney, Agent, or Firm — Jundong Ma

(57) ABSTRACT

Disclosed is a novel and innovative class of buck-boost bidirectional inverters achieve ultra high efficiency in applications requiring converting of one or more low and variable DC voltages of one or more power sources (which may include a battery, a low-voltage DC source, or a set of PV solar panels) to an AC voltage (e.g., connected to a grid) through a single-stage power conversion with step modulation.

12 Claims, 27 Drawing Sheets

FIG. 7 (Related Art – Bidirectional Cell)

Diode Reverse-Recovery Loss (Related Art — Body Diode Recovery Loss)

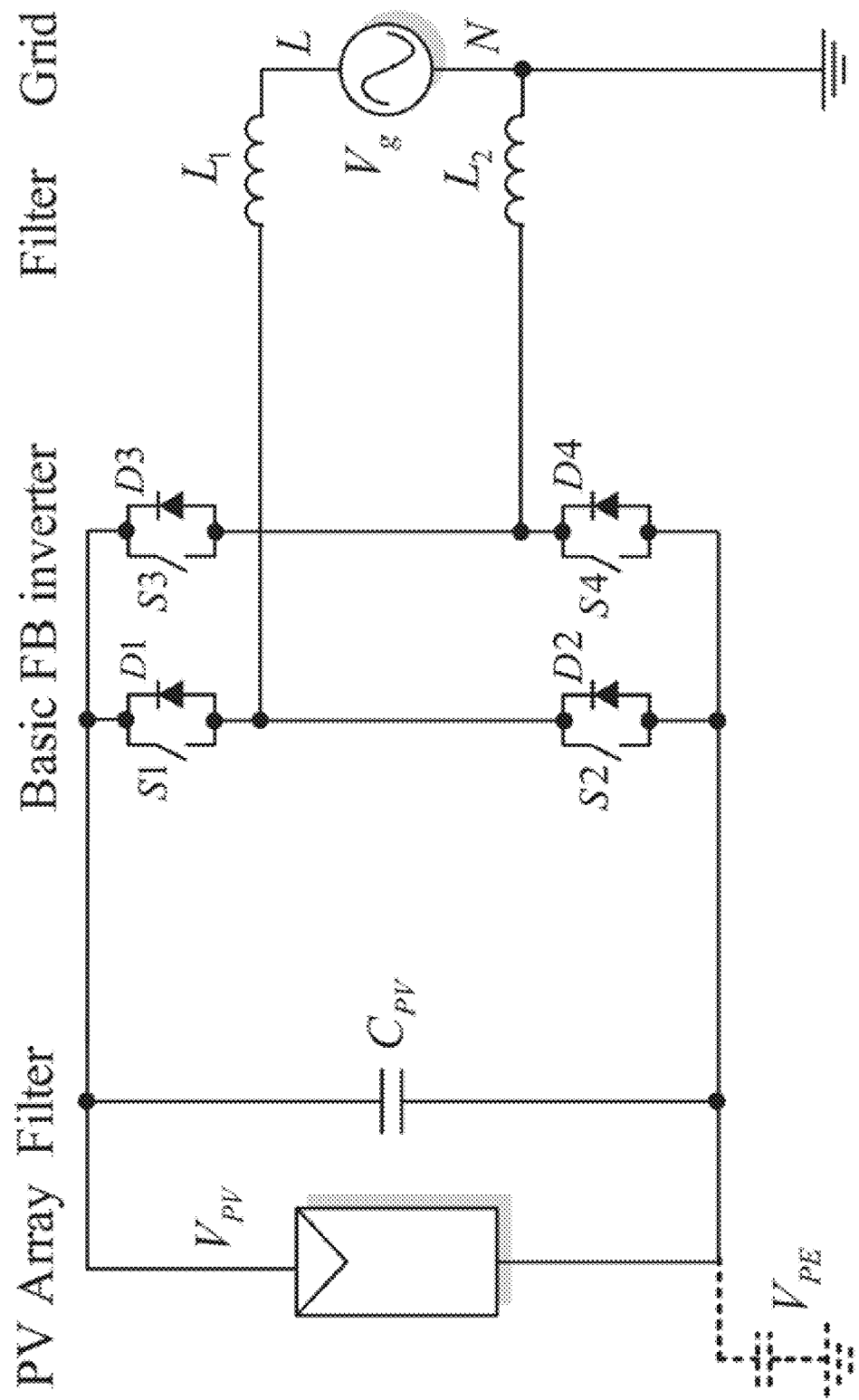
FIG. 9 Related Art Basic FB Inverter

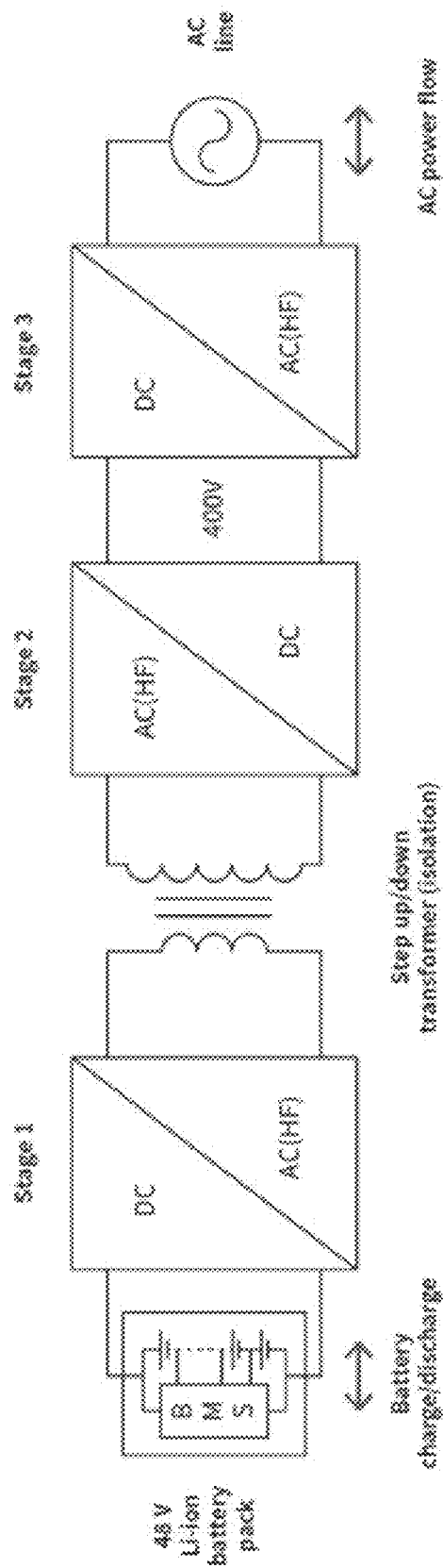
FIG. 11 Related Art of Battery Input Inverter (three stages)

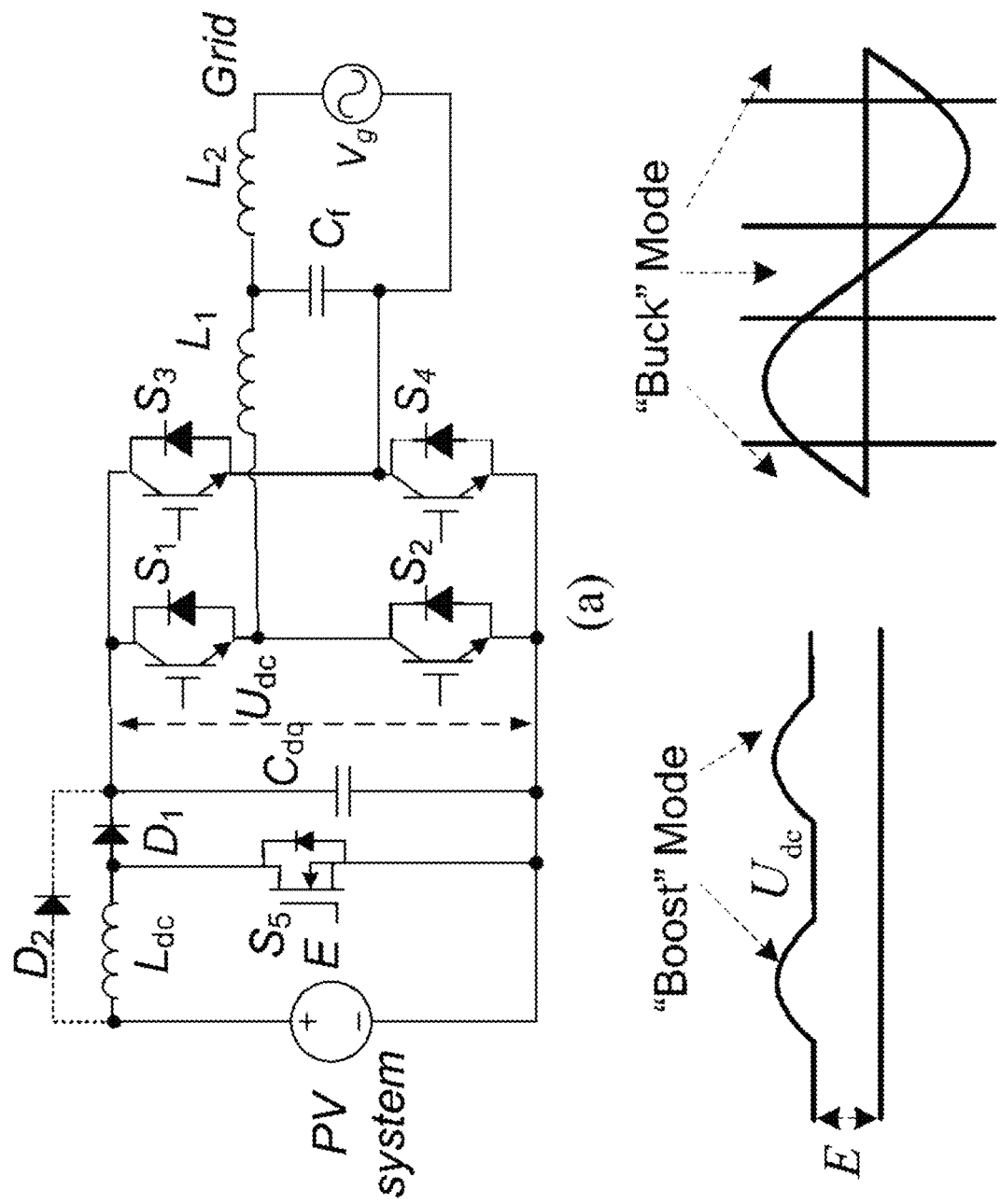
FIG. 12A Related Art Aalborg Inverter

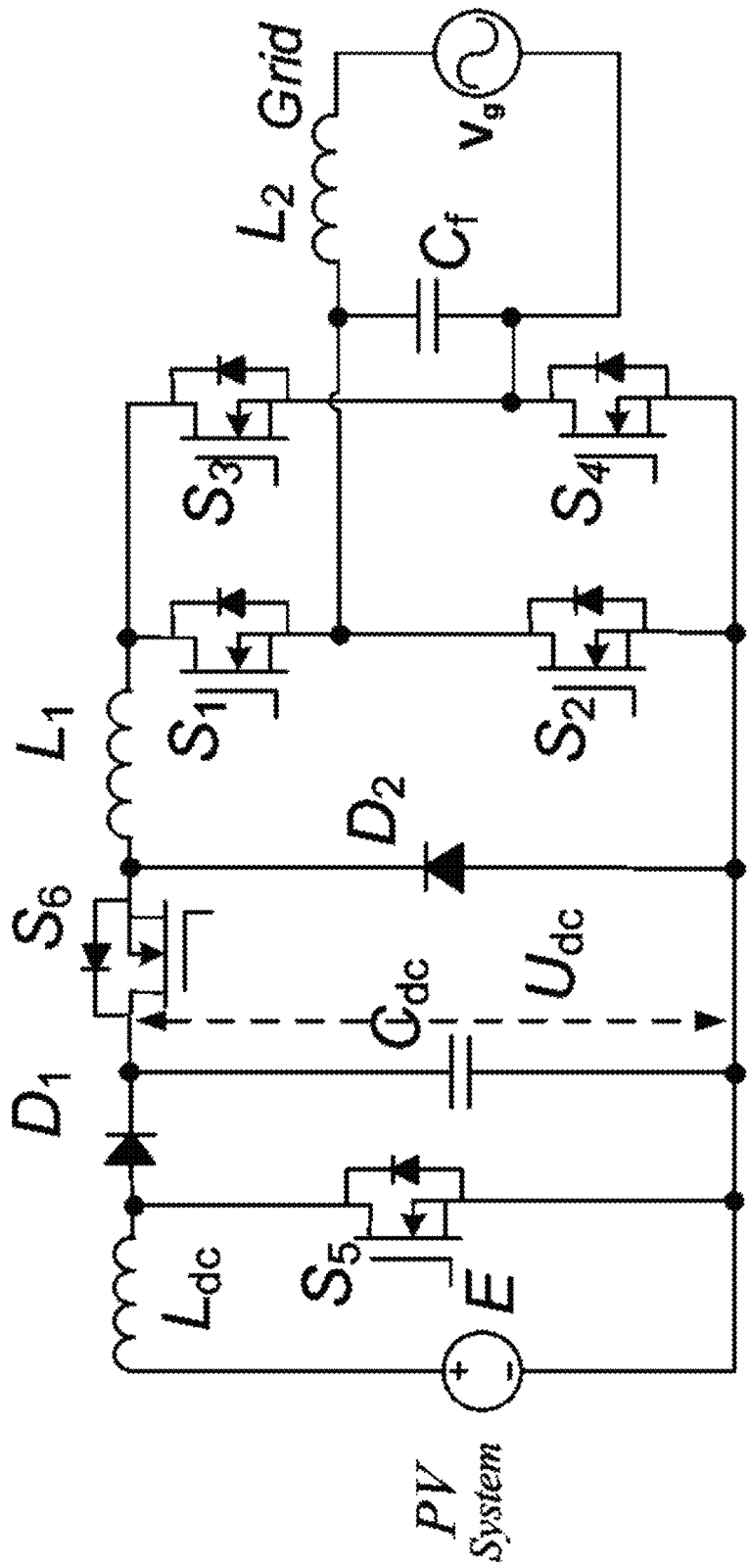
FIG. 12B Related Art Aalborg Inverter

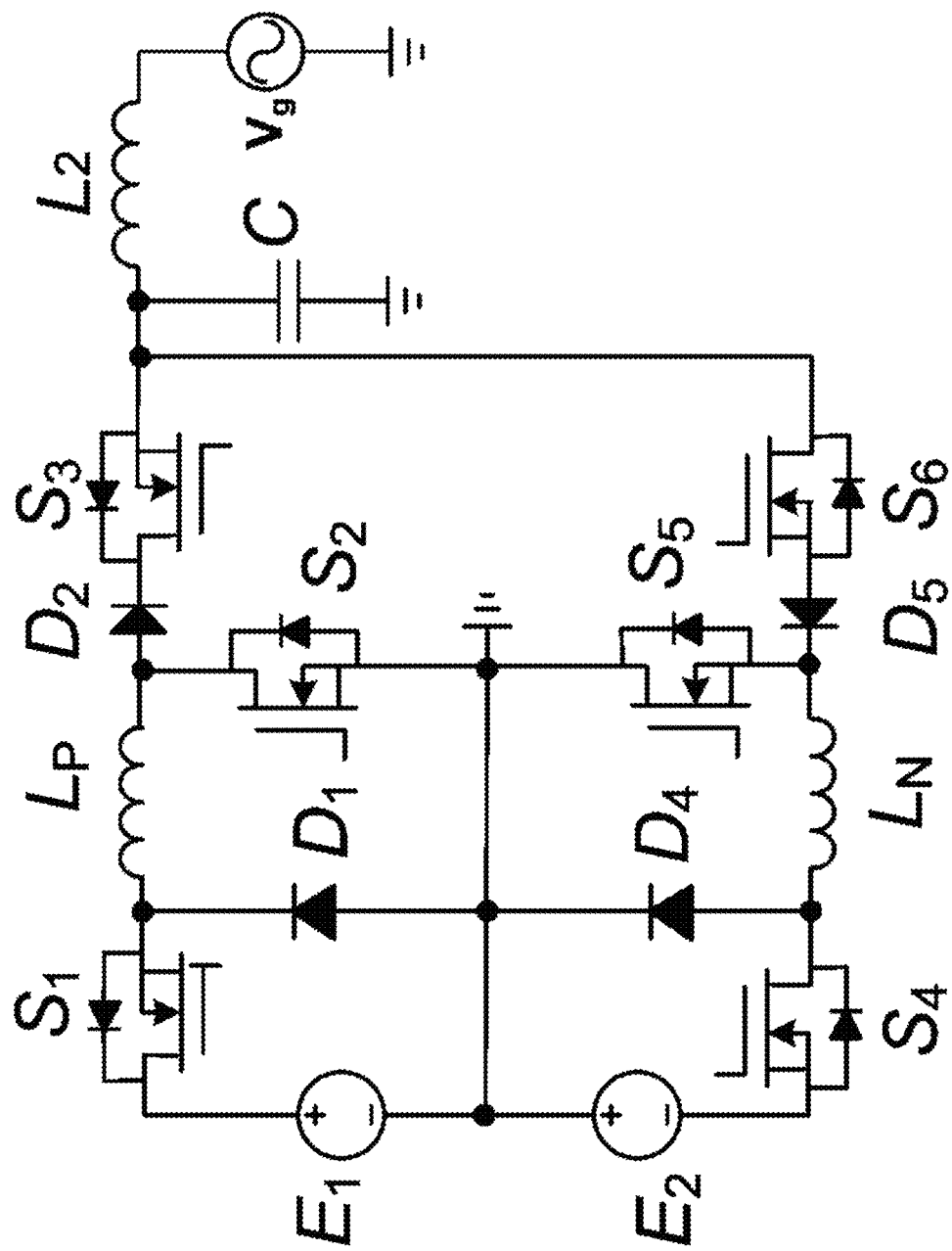
FIG. 12C Related Art Aalborg Inverter

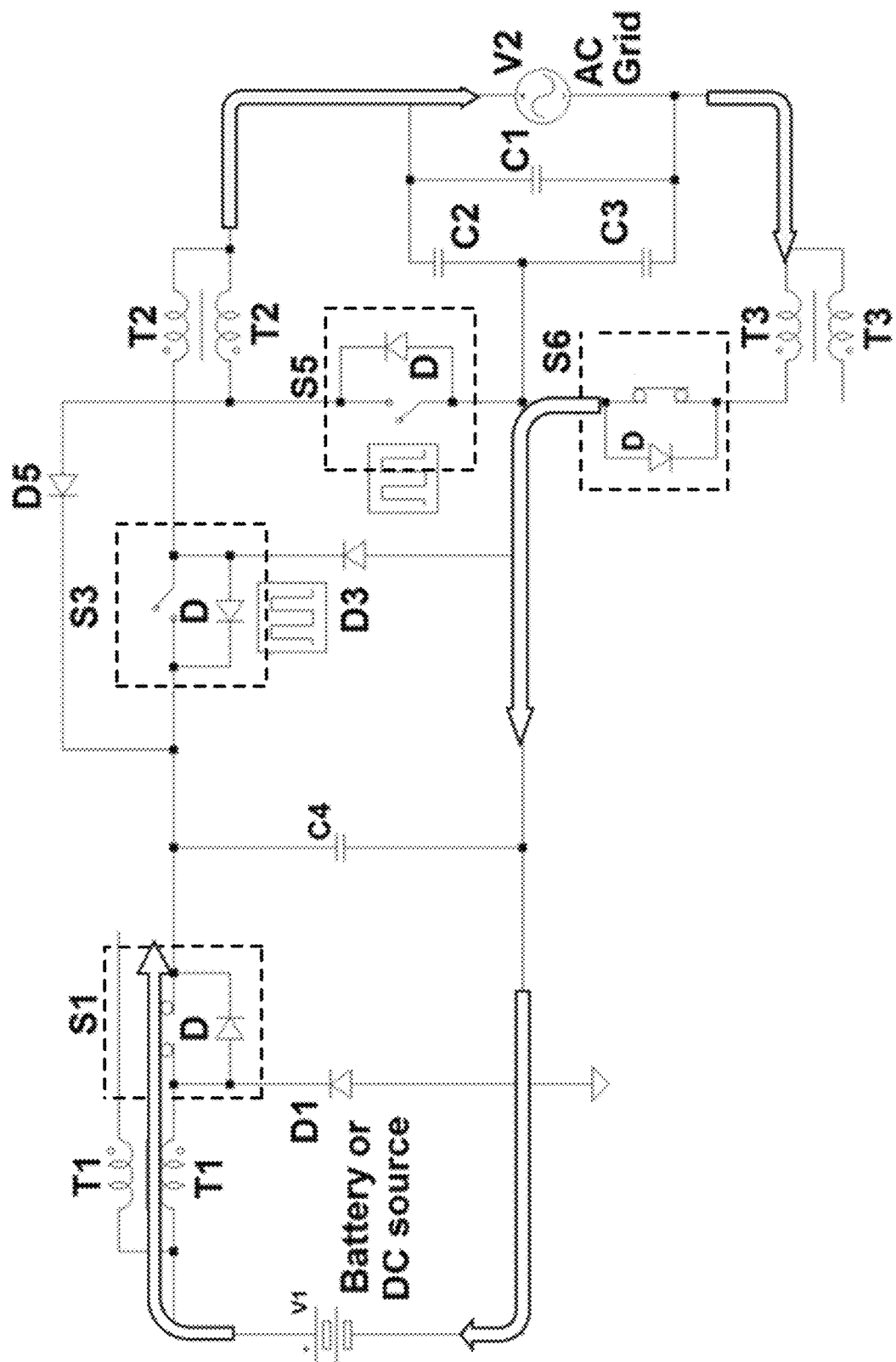
FIG. 14 illustrates step modulation during period T-1

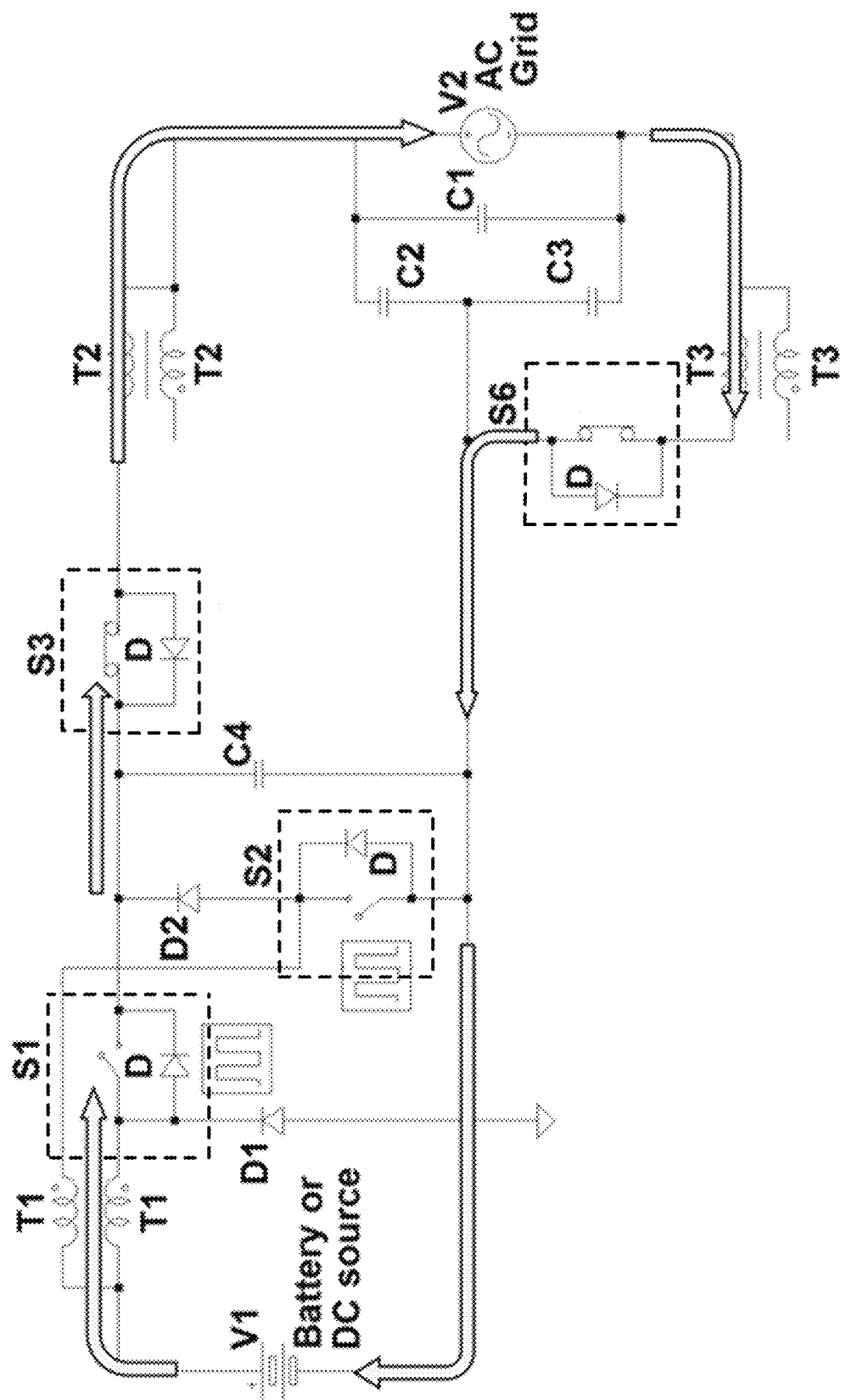
FIG. 15 illustrates step modulation during period T-2

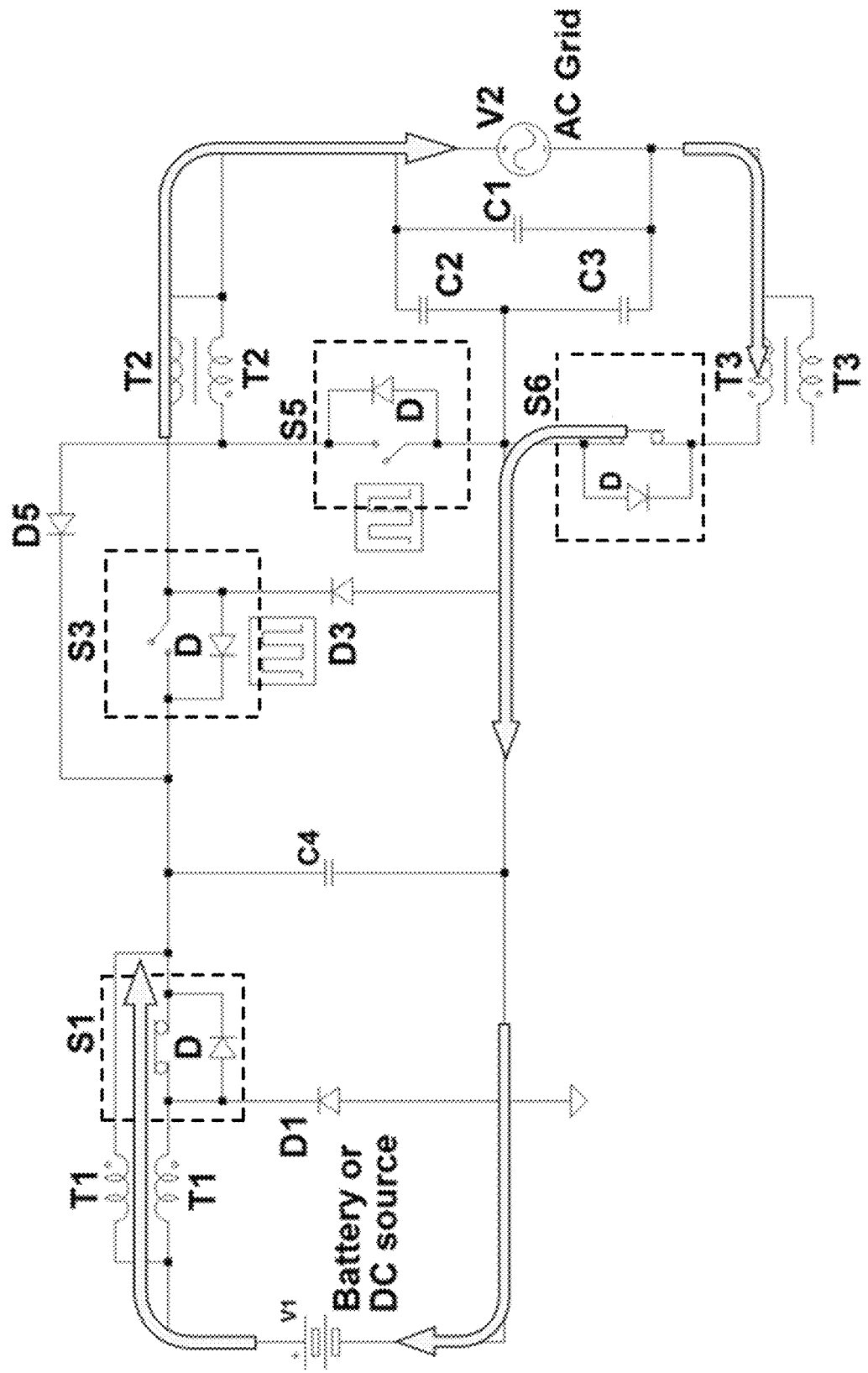
FIG. 16 illustrates step modulation during period T-3

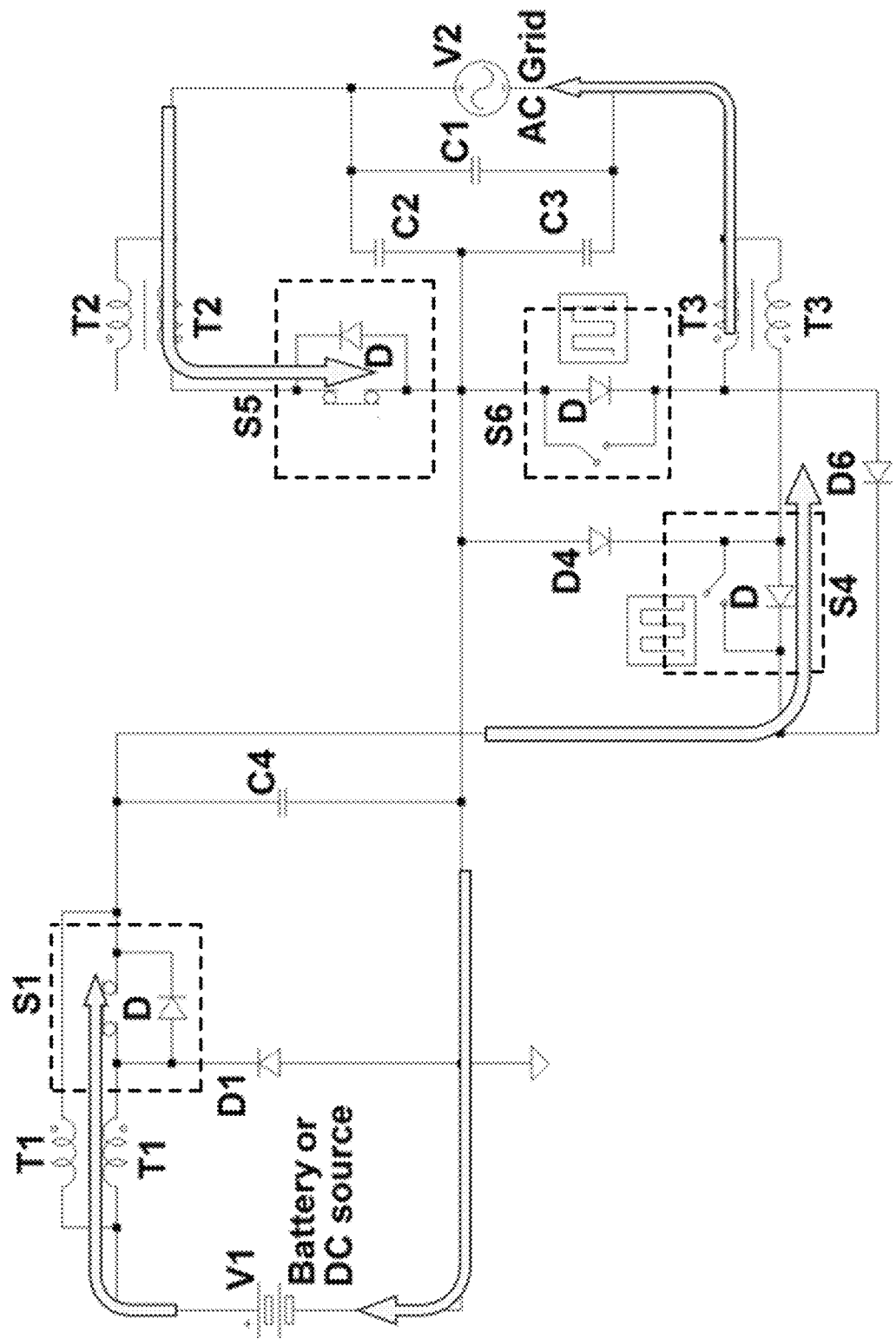
FIG. 17 illustrates step modulation during period T-4

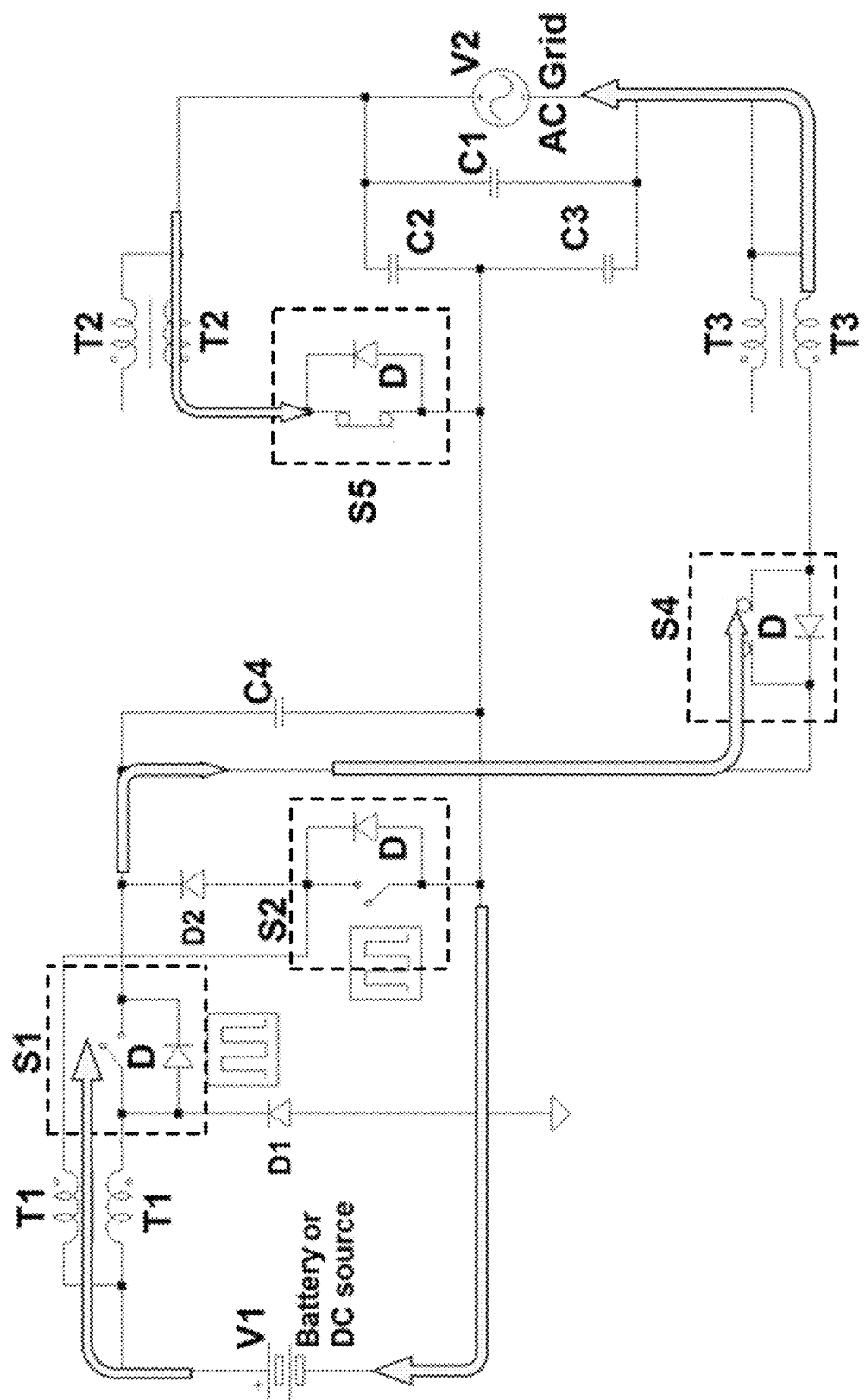
FIG. 18 illustrates step modulation during period T-5

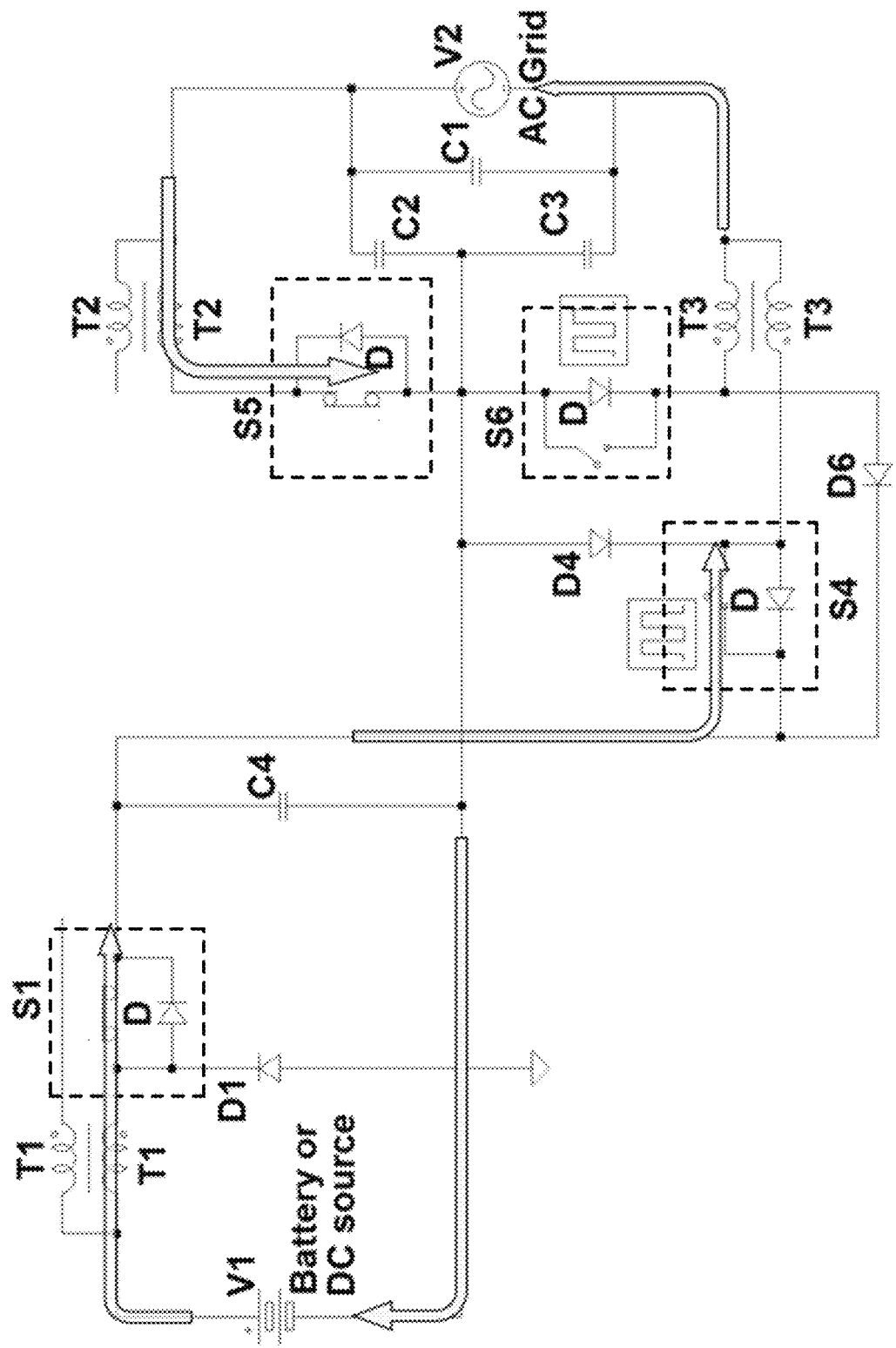
FIG. 19 illustrates step modulation during period T-6

SINGLE STAGE BUCK-BOOST INVERTER WITH STEP MODULATION

CROSS-REFERENCE TO RELATED APPLICATION

This application is a national stage application under 35 U.S.C. § 371 and claims the benefit of PCT Application No. PCT/US2021/050550 having an international filing date of Sep. 15, 2021, which designates the United States, and claims the benefit under 35 U.S.C. § 119(e) of Provisional Patent Application No. 63/240,367, filed Sep. 3, 2021. The entire disclosures of aforesaid prior applications are hereby incorporated by reference.

INTRODUCTION

In the power conversion world, there are a lot of applications that require converting a low DC voltage (of, e.g., a battery) to an AC voltage (e.g., connected to a grid). In a solar power generation, it requires a PV panel (which may be a variable DC voltage source) to go through two, or other multiple, stages of power conversions in converting solar energy to AC power (e.g., connected a grid). A new class of buck-boost bidirectional inverters achieve ultra high efficiency in these applications through a single-stage power conversion.

RELATED ART

The present disclosure relates to a single stage DC-AC power inverter, particularly for as a battery source grid-connected applications. In the past decade, some new power conversion topologies were proposed for grid-connected applications to achieve higher efficiency, lower cost, and smaller footprint. The following publications are just some of the latest proposed topologies in this endeavor:

Exemplary Non-Patent Publications (1) Weimin Wu, Junhao Ji, and Frede Blaabjerg (Fellow, IEEE), "*Aalborg Inverter—A New Type of "Buck in Buck, Boost in Boost" Grid-Tied Inverter*," IEEE Trans. Power Electron., vol. 30, no. 9, September 2015.
(2) Baifeng Chen, "*High-efficiency Transformerless PV Inverter Circuits*," In. Proceeding of Doctor of Philosophy in Electrical Engineering, Aug. 13, 2015, Blacksburg, Virginia.
(3) Weimin Wu, "*A Modified Aalborg Inverter Extracting Maximum Power From One PV Array Source*," CPSS June 2019.
(4) Sivaramnadh D P1, K L Sreekumar, "*Aalborg Grid-Tied Inverter for Photovoltaic Applications*," website: www.ijareeie.com Vol. 6, Issue 6, June 2017.

Exemplary US Patent Documents (5) CHEN, "*Novel FWS DC-AC Grid Connected Inverter*," US 2020/02520031A1 (with priority date of Nov. 8, 2019), Aug. 6, 2020.

All of the five (5) above-identified and numbered related art references (numbered as 1-5), as well as all of other related art references identified in the present disclosure, are hereby incorporated by reference in their respective entireties.

In related art (2) by Baifeng Chen, Doctor Thesis of Virginia Tech, it described various PV inverter topologies. However, for inverters having low voltage inputs, it requires two stages, or other multiple stages of power conversions. See FIG. 11 (showing a related art). A multi-stage power conversion means that in a signal chain, there are multiple high-frequency (HF) switches in respective switching actions at a same time, which causes associated semiconductor switches to incur switching losses during an operation.

Presently disclosed one or more exemplary embodiments have only one switch in a switching action for a given time, thereby greatly achieving improved system efficiency.

In the related art shown in FIGS. 10A-D, they show one or more DC link capacitors provided in between power conversion stages, for two-stage, or otherwise multi-stage, inverter topologies. The shown one or more DC link capacitors are required. Normally, a large number of bulky electrolytic capacitors are used in all conventional multi-stage inverter topologies.

Presently disclosed one or more exemplary embodiments has/have only a single-stage power conversion structure. As a result, there is no DC link, and thus no DC link capacitor, in each embodiment. This single-stage power conversion approach, and thus the resulting set of configurations, results in, among other advantages, saving system board space, improving system life dependency, and reducing cost.

Related arts (1), (3) and (4) relate to different circuit configurations of an Aalborg inverter. Also see FIGS. 12A-C. A configuration shown in FIG. 12A uses a similar modulation scheme to step modulation. However, this related art configuration is a unidirectional configuration, resulting in the energy being able to flow in only one direction. A major drawback of a unidirectional configuration like this one, is missing of a return path of $C_{dc}$, resulting in the configuration having problems in a light-load or on-load condition in that the configuration has, e.g., potential of having waveform distortion.

Configurations shown in FIGS. 12B and 12C are different configurations of an Aalborg Inverter. Both topologies are also unidirectional. As a result, they both have potential problems of the same or a similar nature in light-load or on-load conditions.

Each of presently disclosed one or more exemplary embodiments has 6 controls, rendering the respective circuit structure to be bidirectional. As a result, for each embodiment, the energy flows in both directions, resulting in the respective embodiment working without problems (of the same or a similar nature) in light-load or on-load conditions.

BRIEF SUMMARY

In one aspect, presently disclosed one or more exemplary embodiments of a Single-Stage Buck-Boost Inverter with Step Modulation, can convert one or more low and variable DC voltages of one or more power sources—which may include a battery, a low-voltage DC source, or a set of PV solar panels—to a fixed AC voltage through a single-stage power conversion.

In another aspect, presently disclosed one or more exemplary embodiments drastically improve the system efficiency. Using step modulation to operate, each disclosed embodiment, for a given time in a power conversion process, entails that there is only one device that is in a switching action. This is in contrast to the related art, where for a given moment, there have to be multiple devices in respective switching actions in a signal chain.

In still another aspect, presently disclosed one or more exemplary embodiments have achieved one or more electrolitic-capacitor-less configurations (designs). With conventional configurations (designs) in the related art, which have a DC link or DC bus, such a configuration/design has to have one or more capacitors of a relatively large size to store energy to maintain clean DC for a power conversion process. However, the presence (i.e., inclusion) of one or more such bulky electrolitic capacitors disadvantageously, among other drawbacks, reduces product life expectancy, increases product footprint size (as an electrolitic capacitor, which is bulky, takes up a large space), and increases cost. In contrast, presently disclosed one or more exemplary embodiments avoid those aforementioned disadvantages as a result of their electrolitic-capacitor-less configurations (designs).

In still another aspect, presently disclosed one or more exemplary embodiments achieve a single-stage power conversion from a low DC voltage to an AC voltage (e.g., connected to grid). Using one or more previously disclosed bidirectional cell configurations—which was invented, and disclosed in US 2020/0252003A1 (hereinafter referred to as "CHEN's Previous Disclosure"), by inventor CHEN of the present appliation—the presently disclosed one or more embodiments avoid slow recovery time in MOSFET body diode (which otherwise would have been incurred in conventional bidirectional configurations) and achieve soft switching.

In still another aspect, presently disclosed one or more exemplary embodiments achieve both bidirectional energy flow and buck-boost operation, both of which are advantageous features in that they work in concert and collectively enable both discharge and charge modes (for each presently disclosed embodiment). More specifically, with these two advantageous features, the DC side (e.g. having a battery) may advantageously be in a mode of having a lower DC voltage, or higher voltage, than an output peak AC voltage. During a charge mode of an operation, the AC side becomes an energy source. And a presently disclosed embodiment may be programmed such that for a battery of the DC side, respective values of operational parameters (such as voltage and/or current) can be set to ones that are different from respective values of those same parameters set during a discharge mode of an operation.

BRIEF DESCRIPTION OF THE DRAWINGS

The description of the illustrative one or more embodiments presently disclosed can be read in conjunction with the accompanying figures. It will be appreciated that for simplicity and clarity of illustration, elements illustrated in the figures, unless expressly specified, have not necessarily been drawn to scale. Also, any text and/or any numerical data (numbers) appeared on any drawing figures is provided to illustrate an exemplary embodiment or implementation, and thus is provided for the purpose of illustration and not for the purpose of limitation. For example, the dimensions of some of the elements may be exaggerated relative to other elements. Embodiments incorporating teachings of the present disclosure are shown and described with respect to the figures presented herein, in which:

FIG. 9 shows a basic FB inverter in the related art.

FIG. 11 shows a related art configuration of an inverter with a battery being an input (having three stages in a power conversion process).

FIGS. 12A-C show related art configurations of an Aalborg inverter.

FIG. 13A shows a condensed version of the key waveforms. FIGS. 13B and 13C show zoomed-in (enlarged) versions of the upper and lower halves of the same condensed version of the key waveforms shown in FIG. 13A, respectively, for illustration purposes.

FIGS. 14-19 illustrate current flow diagrams of step modulation (of one or more applicable configurations) performed during periods T-1 to T-6 of a discharge mode cycle, respectively, according to one or more embodiments of the present disclosure.

DETAILED DESCRIPTION

In the following detailed description of exemplary embodiments of the disclosure in this section, specific exemplary embodiments in which the disclosure may be practiced are described in sufficient detail to enable those skilled in the art to practice the disclosed embodiments. However, it is to be understood that the specific details presented need not be utilized to practice embodiments of the present disclosure. The following detailed description is, therefore, not to be taken in a limiting sense, and the scope of the present disclosure is intended to be defined by expressly provided claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. Moreover, the use of the terms first, second, etc. do not denote any order or importance, but rather that the terms first, second, etc. are used to distinguish one element from another.

Those of ordinary skill in the art will appreciate that the components and basic configuration depicted in the following figures may vary. Other similar or equivalent components may be used in addition to or in place of the components depicted. A depicted example is not meant to imply limitations with respect to the presently described one or more embodiments and/or the general disclosure.

Figure 1:
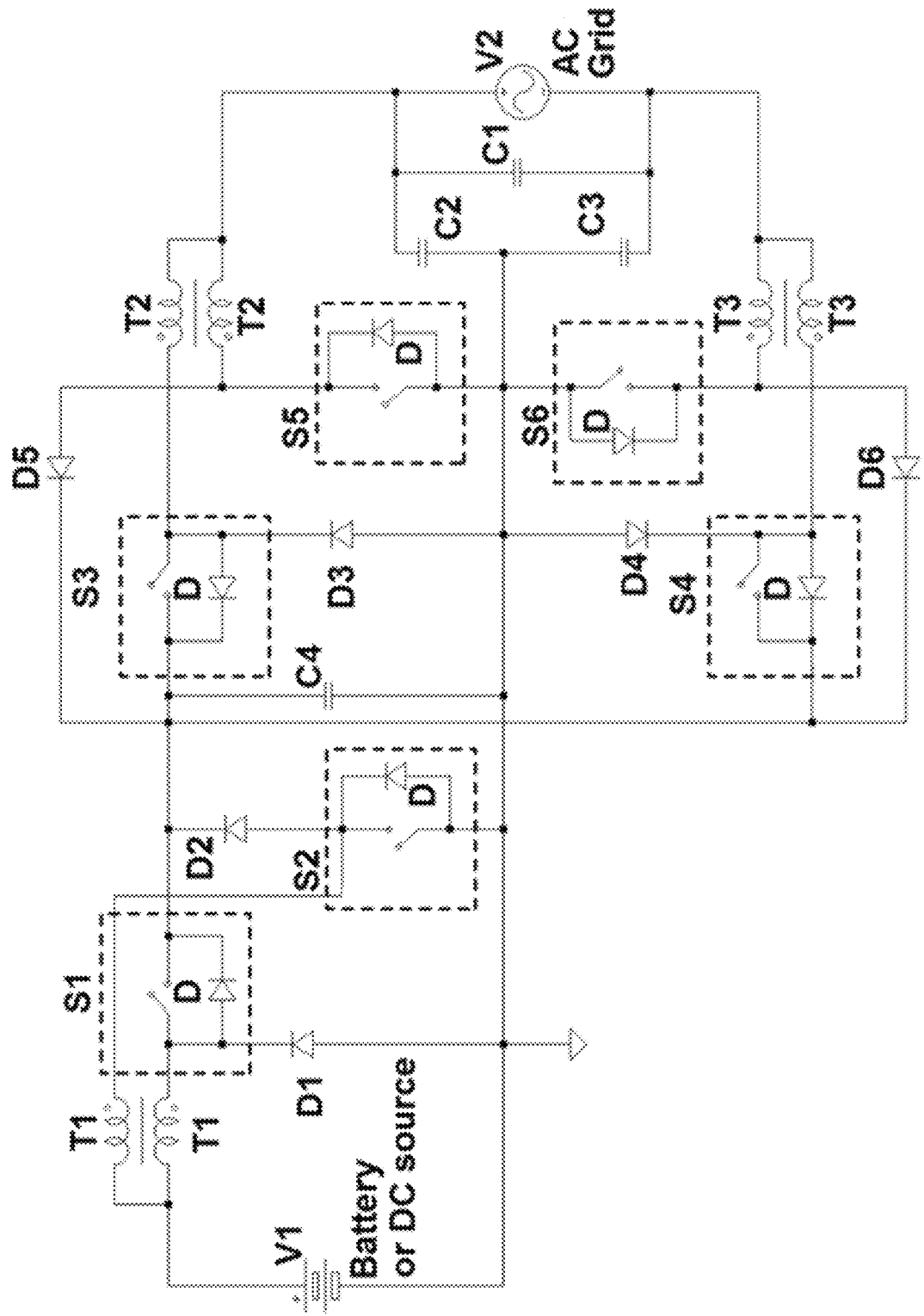
FIG. 1 illustrates a general form of one or more embodiments of a presently disclosed single stage buck-boost inverter.

Presently disclosed one or more exemplary embodiments of a single stage buck-boost step modulation converter are illustrated in a general form in FIG. 1. It comprises three bidirectional cells illustrated in FIG. 7. The DC source can be any one, or any combination, of photovoltaic (PV) arrays, batteries, fuel cells, and others. The AC source can be a utility grid, one or more single-phase electric motors, or others.

Figure 2:
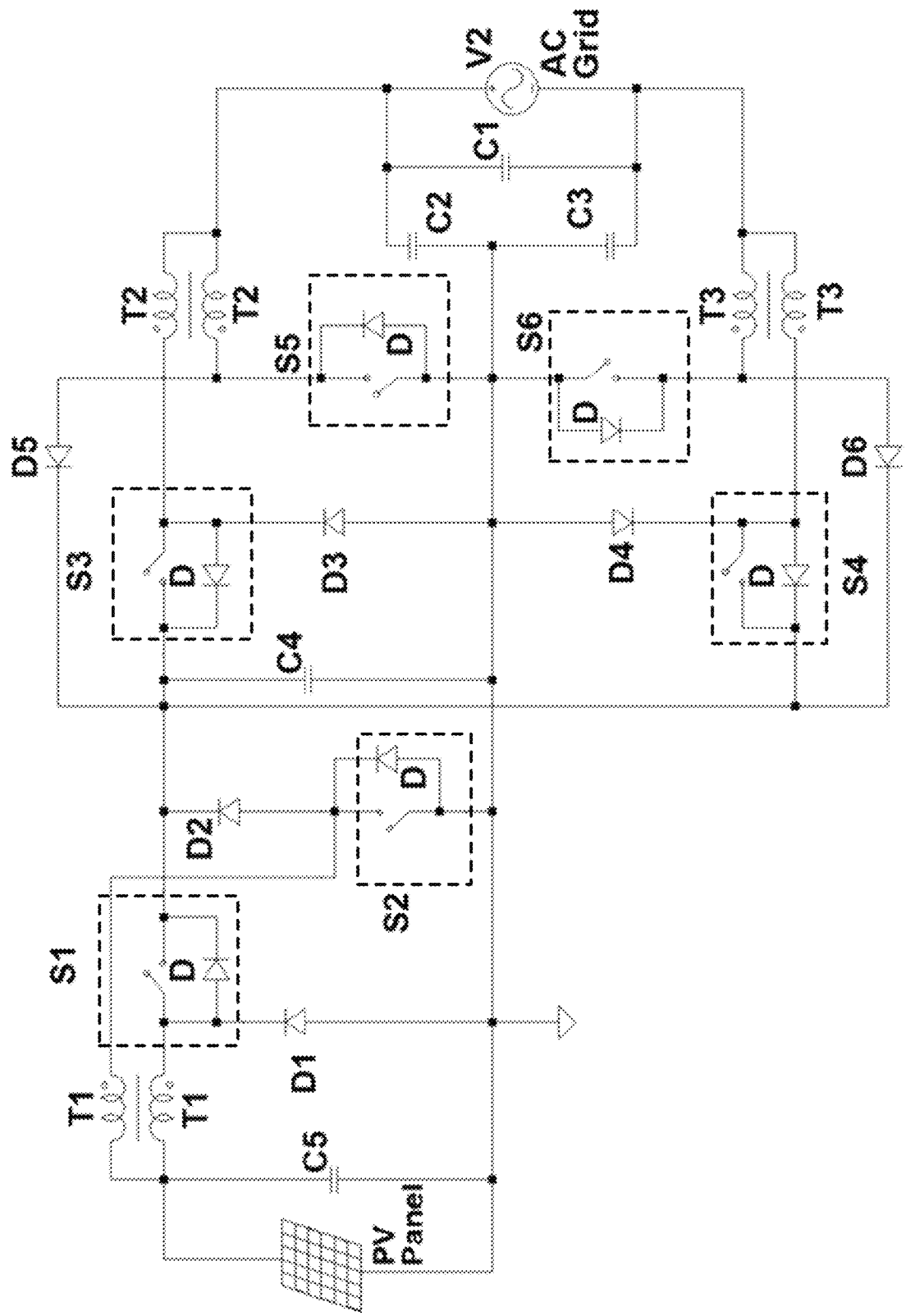
FIG. 2 illustrates a general form of one or more embodiments of a presently disclosed single stage buck-boost inverter with a PV panel as a DC input.

FIG. 2 illustrates presently disclosed one or more exemplary embodiments, where a set of one or more connected PV panels is used as an input source.

Figure 3:
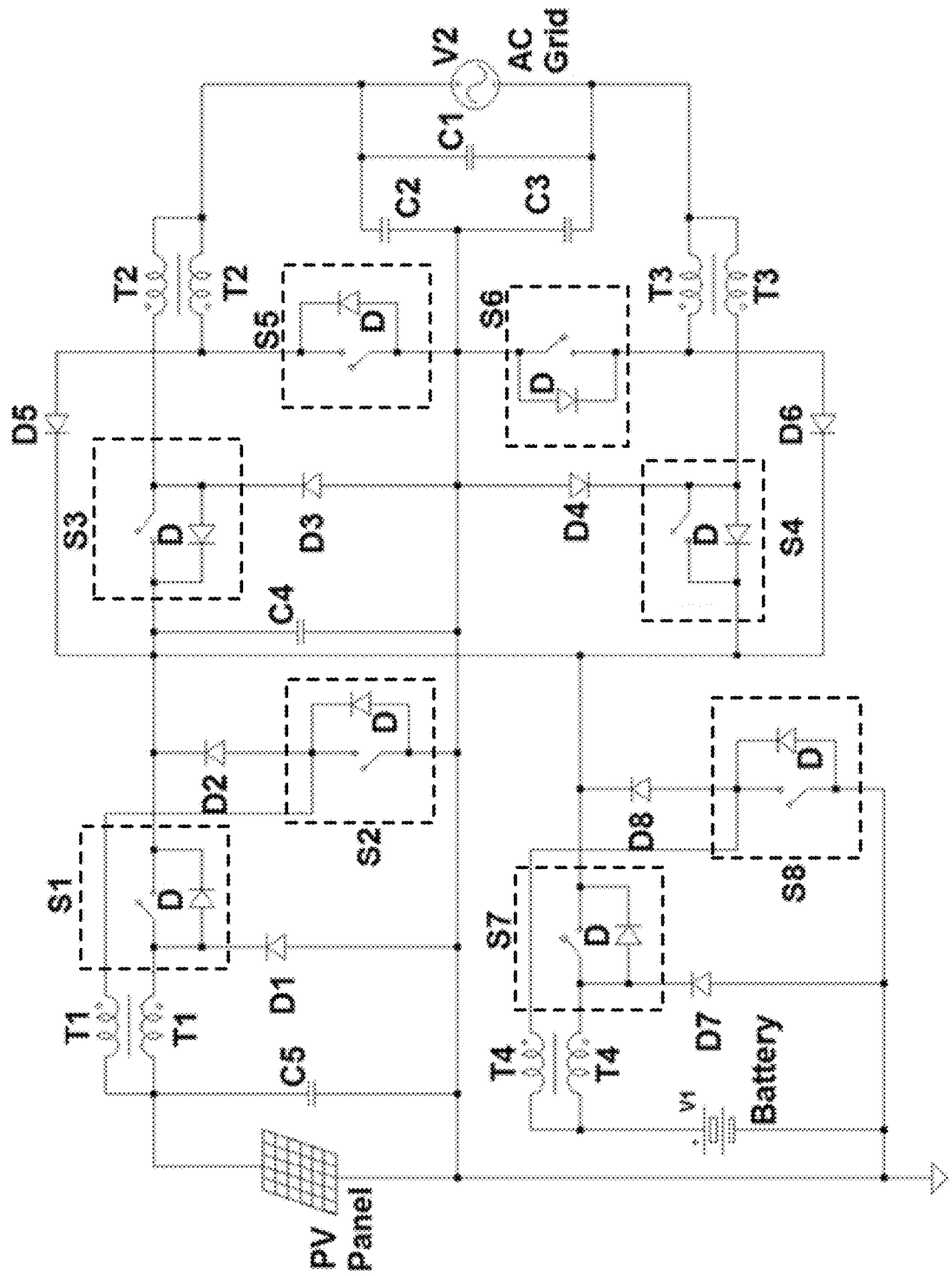
FIG. 3 illustrates a general form of one or more embodiments of a presently disclosed single stage buck-boost inverter with a connected PV panel and a battery as inputs.

FIG. 3 illustrates presently disclosed one or more exemplary embodiments, where the presently disclosed one or more embodiments can be configured and connected to a combination of a battery and a PV panel, the combination which are used as input sources.

Figure 7:
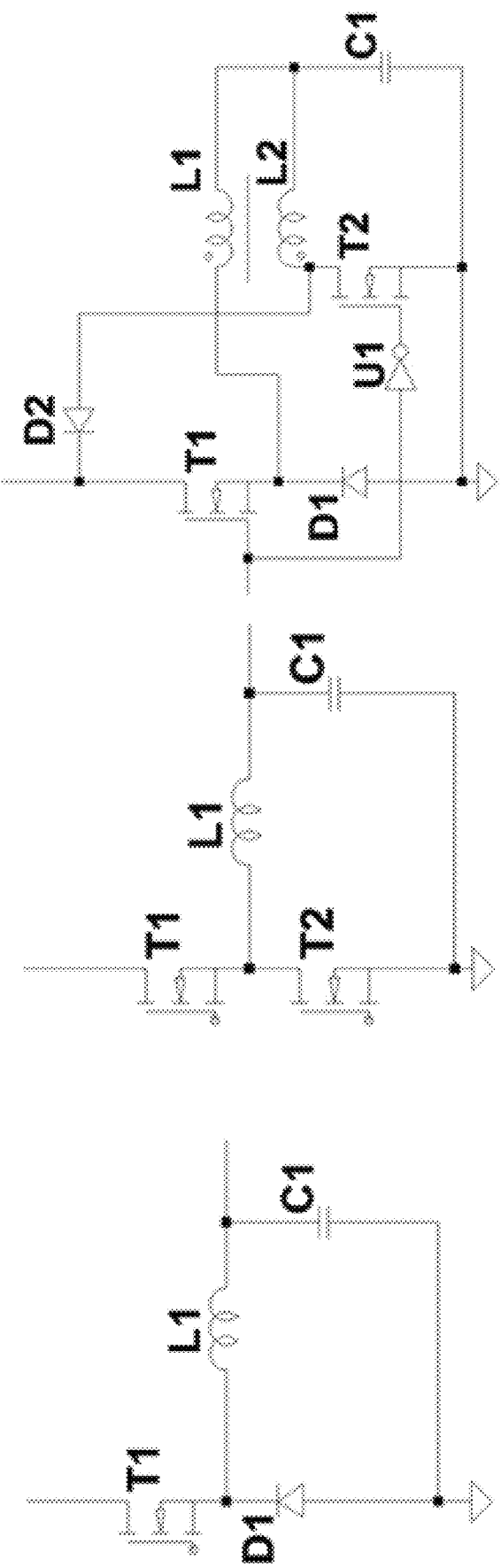
FIG. 7 shows a related art configuration of a bidirectional cell previously disclosed in CHEN's Previous Disclosure.
Figure 8:
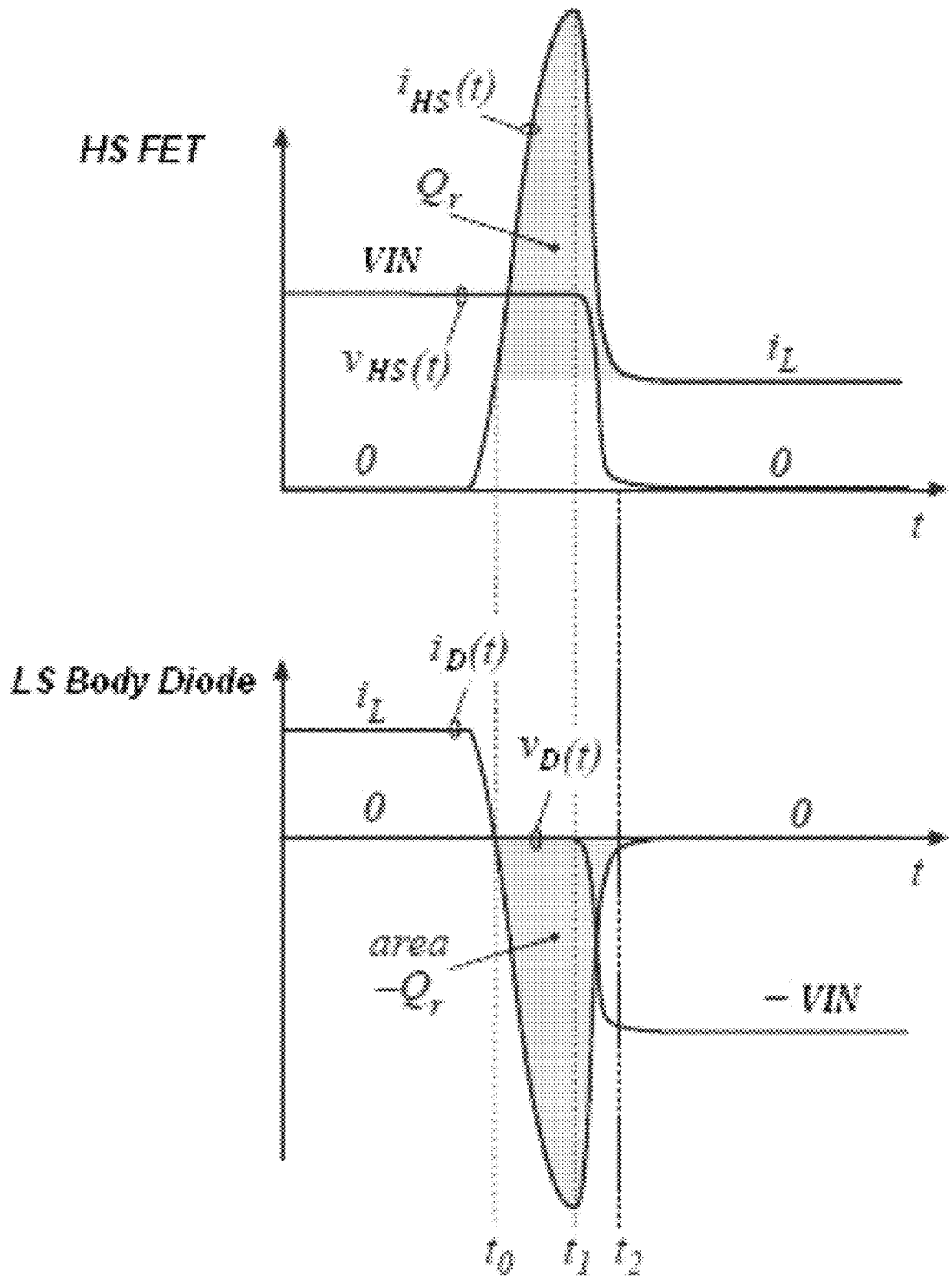
FIG. 8 shows a related art configuration which disadvantageously suffers from undesirable problems resulting from body diode recovery loss.
Figure 10A:
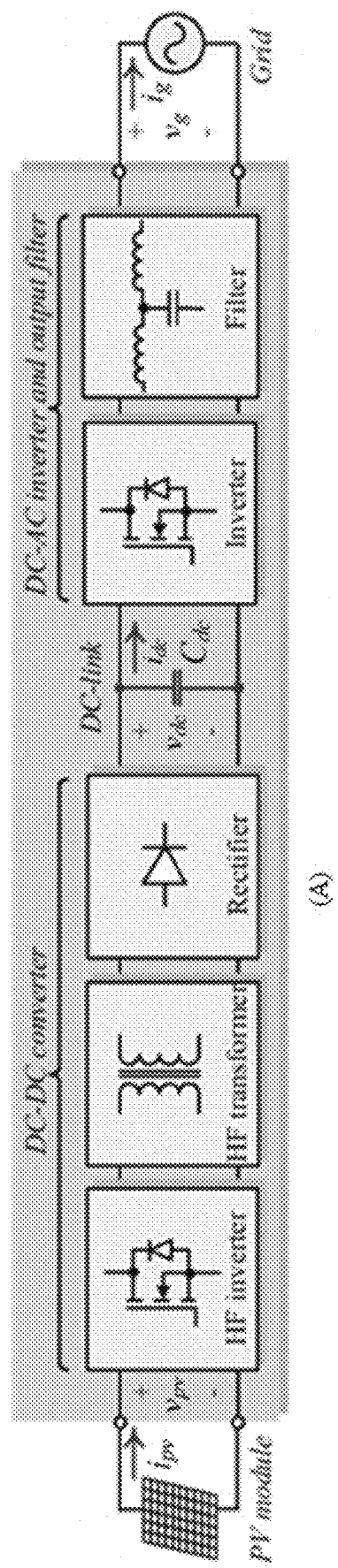
FIGS. 10A-D show a related art configuration of an inverter with a PV being an input.
Figure 10B:
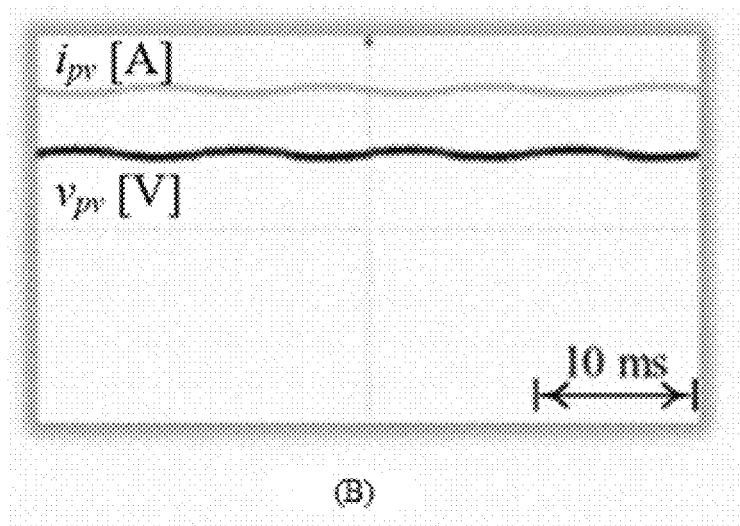
Figure 10C:
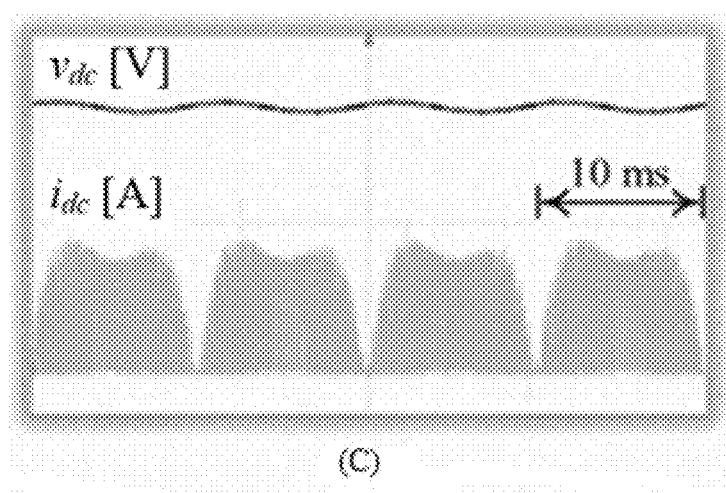
Figure 10D:
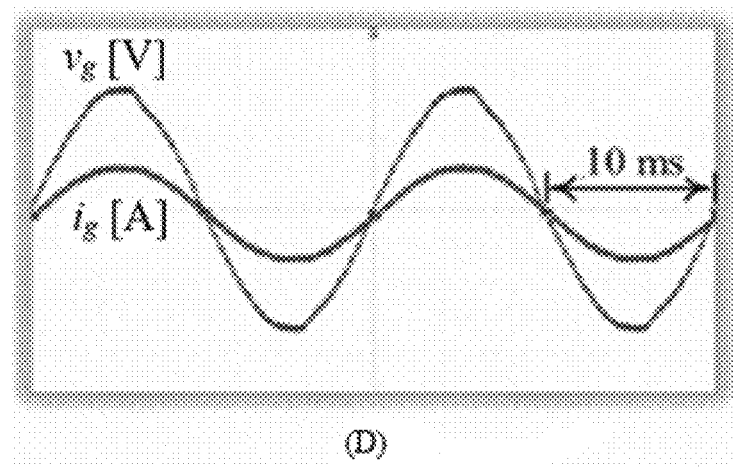

Bidirectional Cell:

Bidirectional circuit topologies are illustrated in FIG. 7. Conventional bidirectional cells are full or half bridge configurations, and they suffer from a problem when high voltage power MOSFETs are used. See FIG. 9. Namely, a high voltage power MOSFET, in nature, has a slow recovery time, as demonstrated in FIG. 8. This creates undesirable high switching losses when circuits work at a frequency higher than (above) 20 kHz.

CHEN's Previous Disclosure addressed, and is believed to have solved, this undesirable problem. Referring to CHEN's Previous Disclosure, one or more coupled inductors are used to prevent, or otherwise effectively disable, a current flow through a body diode. In addition, CHEN's Previous Disclosure utilizes the leakage inductance of a coupled inductor to create soft switching. As a result, the system efficiency is greatly improved.

Figure 4:
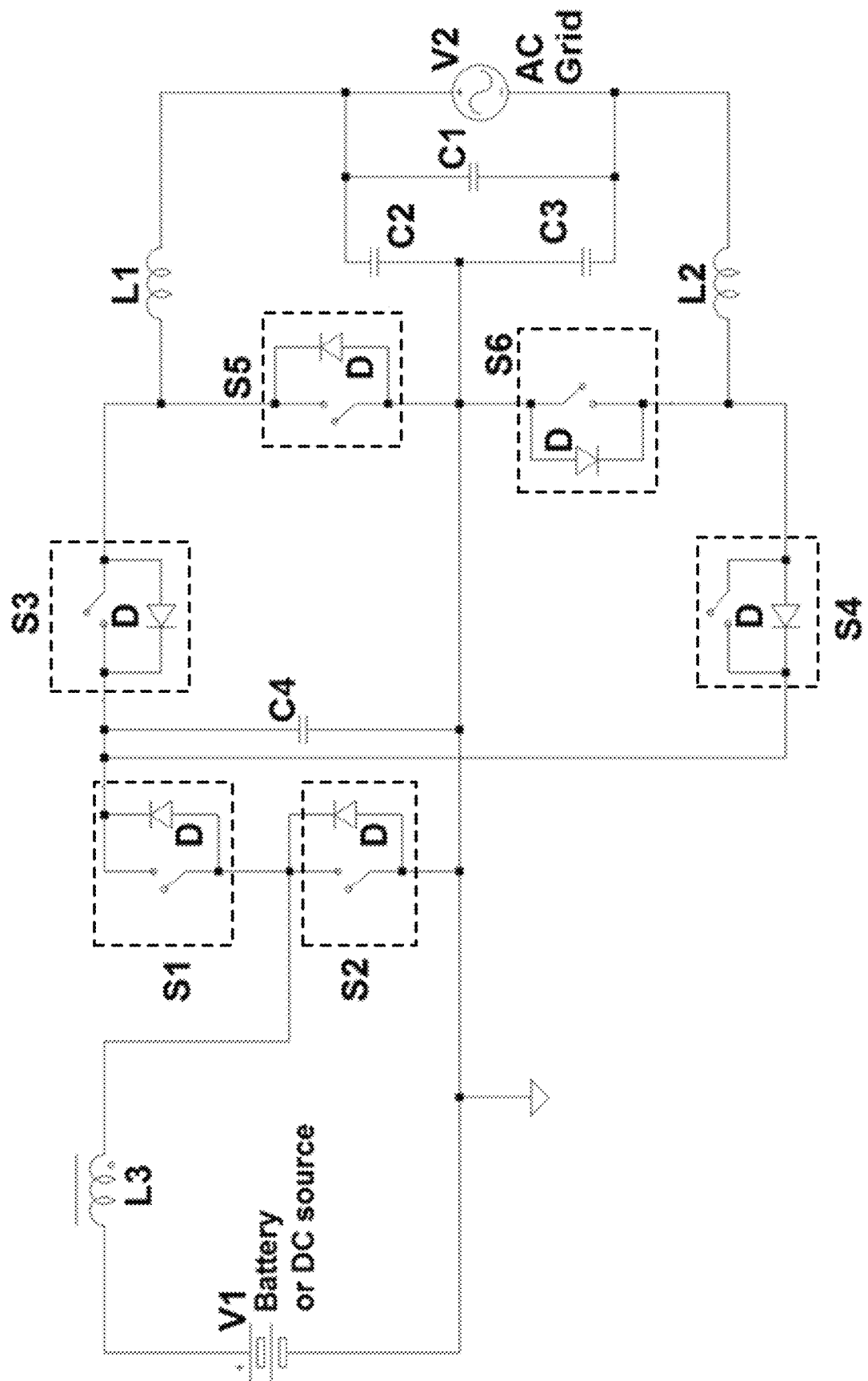
FIG. 4 illustrates a general form of one or more embodiments of a presently disclosed single stage buck-boost inverter using step modulation in a conventional circuit topology with a battery as an input.
Figure 5:
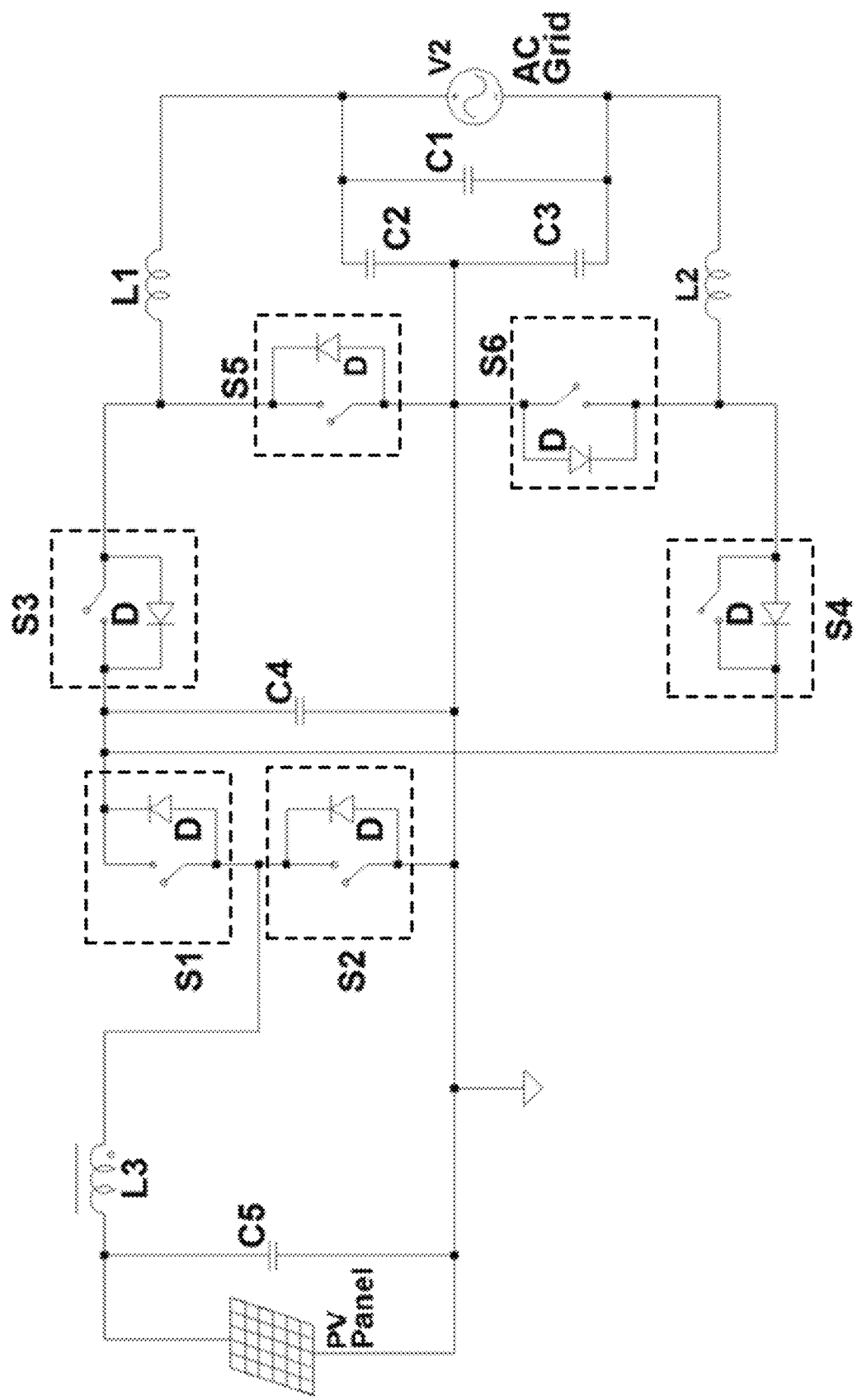
FIG. 5 illustrates a general form of one or more embodiments of a presently disclosed single stage buck-boost inverter using step modulation in a conventional circuit topology with a PV panel as an input.
Figure 6:
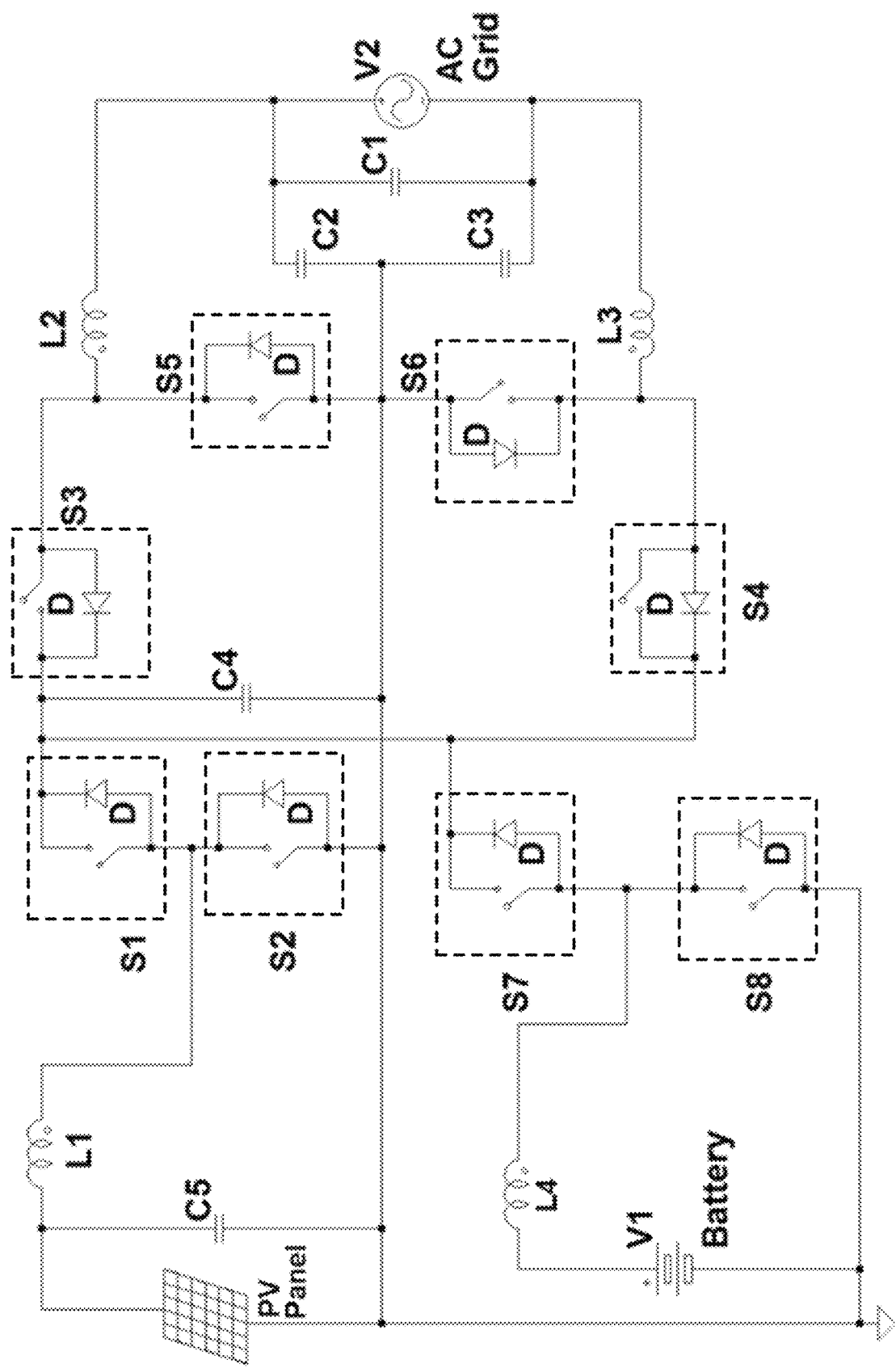
FIG. 6 illustrates a general form of one or more embodiments of a presently disclosed single stage buck-boost inverter using step modulation in a conventional circuit topology with a battery and a PV panel as inputs.

New silicon carbide (SiC) and gallium nitride (GaN) are two major wide bandgap (WBG) power devices. They have very low, or zero, recovery time concerning a body diode. As a result, taking advantage of the low or zero recovery time (concerning a body diode) of SiC and GaN power devices, presently disclosed one or more exemplary embodiments can also be configured to have circuit topologies illustrated in FIG. 4 (showing a battery being used as an input source), circuit topologies illustrated in FIG. 5 (showing a connected PV panel being used as an input source), or circuit topologies illustrated in FIG. 6 (showing a combination of a battery and a PV panel being used as input sources), without departing from the scope and spirit of the present disclosure.

Step Modulation:

Step modulation works with, e.g., three bidirectional cells to achieve a single-stage power conversion, a power conversion (e.g., from a low DC voltage to an AC voltage) which normally needs two stages, or other multiple stages, to achieve. See FIG. 9 and FIG. 10.

A single-stage operation refers to, e.g., boosting one or more low DC voltages to a high AC voltage through a single high-frequency (HF) switch in a switching action. That means, in a given moment, for instance, in converting a DC voltage to a sinusoidal waveform, there is always only one HF switch in action while all other switches are being either shorted or open. See FIGS. 14-19.

With step modulation, modulation or control works as steps. For presently disclosed one or more exemplary embodiments, step modulation operates in, e.g., 6 steps to convert one or more DC voltages to a sinusoidal AC voltage, as illustrated in FIGS. 14-19.

Figure 20:
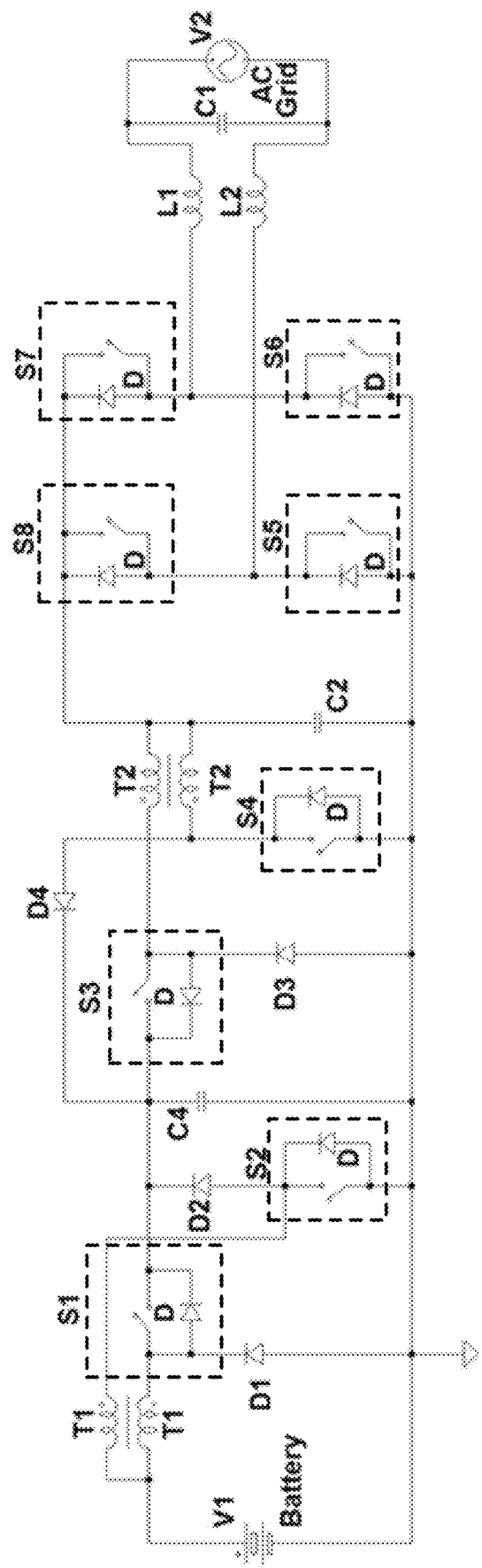
FIGS. 20-22 illustrate exemplary configurations of step modulation alternative to configurations shown in other figures of the present disclosure, according to one or more embodiments of the present disclosure.
Figure 21:
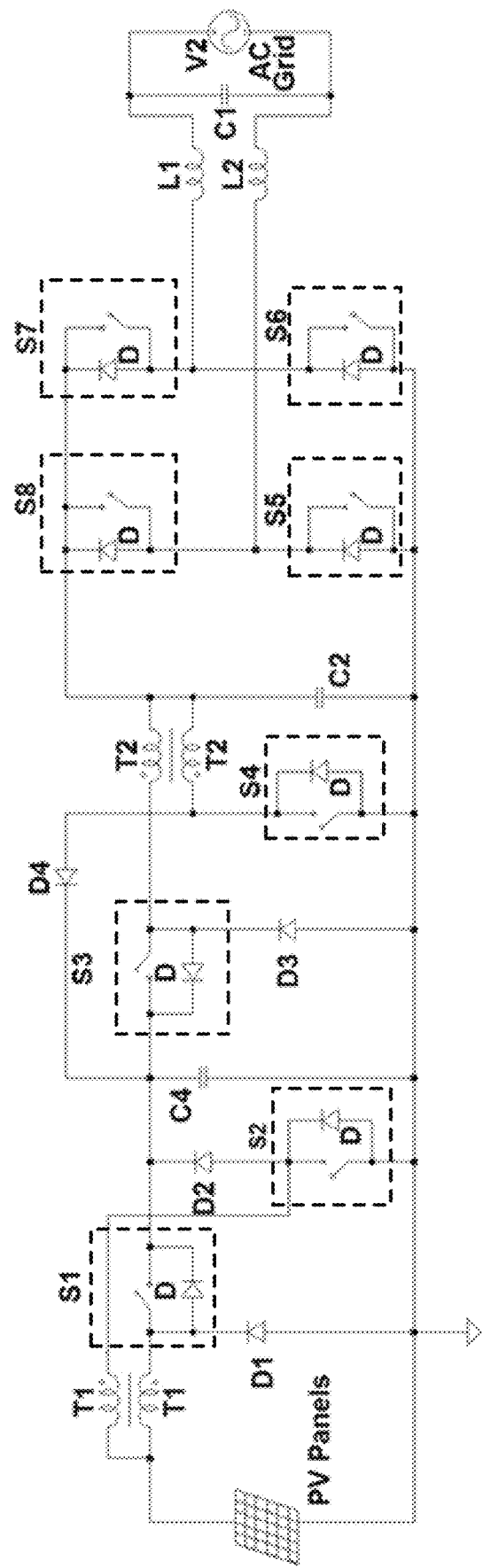
Figure 22:
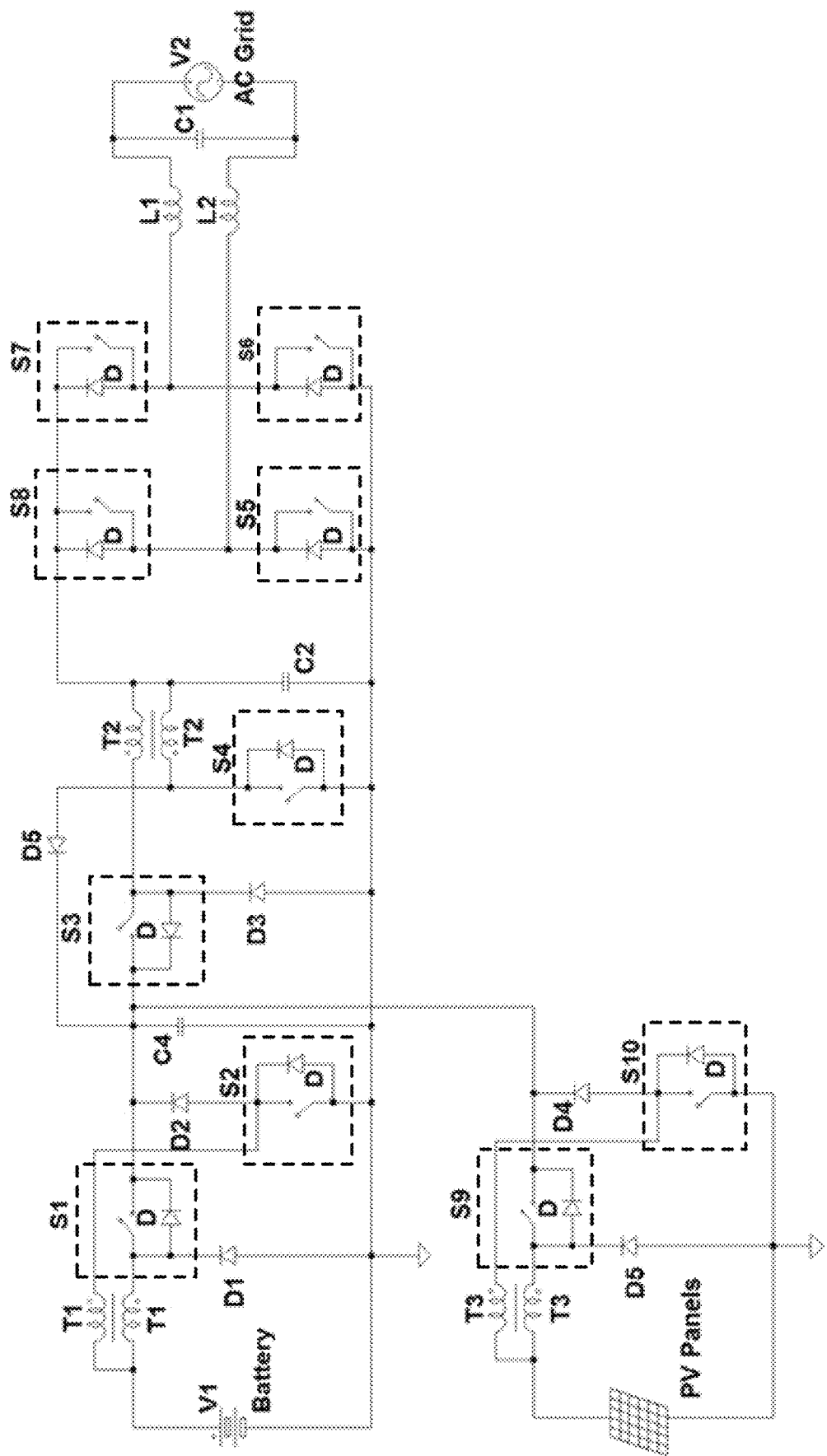

As a skilled artisan readily appreciates, step modulation of the present disclosure, in addition to being implementable with configurations of using three or more cells as amply illustrated in the present disclosure, may also be implemented with cell-consolidating configurations of, e.g., using two cells (along with, inter alia, two sets of LF switches provided to form two alternating current paths of opposite directions flowing across both terminals of an AC power source connected to, e.g., a grid) to achieve a single-stage power conversion, as illustrated in FIGS. 20-22.

These cell-consolidating, or otherwise cell-reducing, configurations of, or otherwise applicable to, step modulation of the present disclosure should be readily apparent in the eyes of a skilled artisan (having learned the principles (relating to step modulation) taught in the present disclosure) in view of cell-consolidating techniques already available in the related art (such as the one or more cell-consolidating techniques shown in FIG. 1D of CHEN's Previous Disclosure). That is, step modulation of the present disclosure may be implemented with various configurations, or otherwise in various forms and designs, without departing from the scope and spirit of the present disclosure.

Figure 13A:
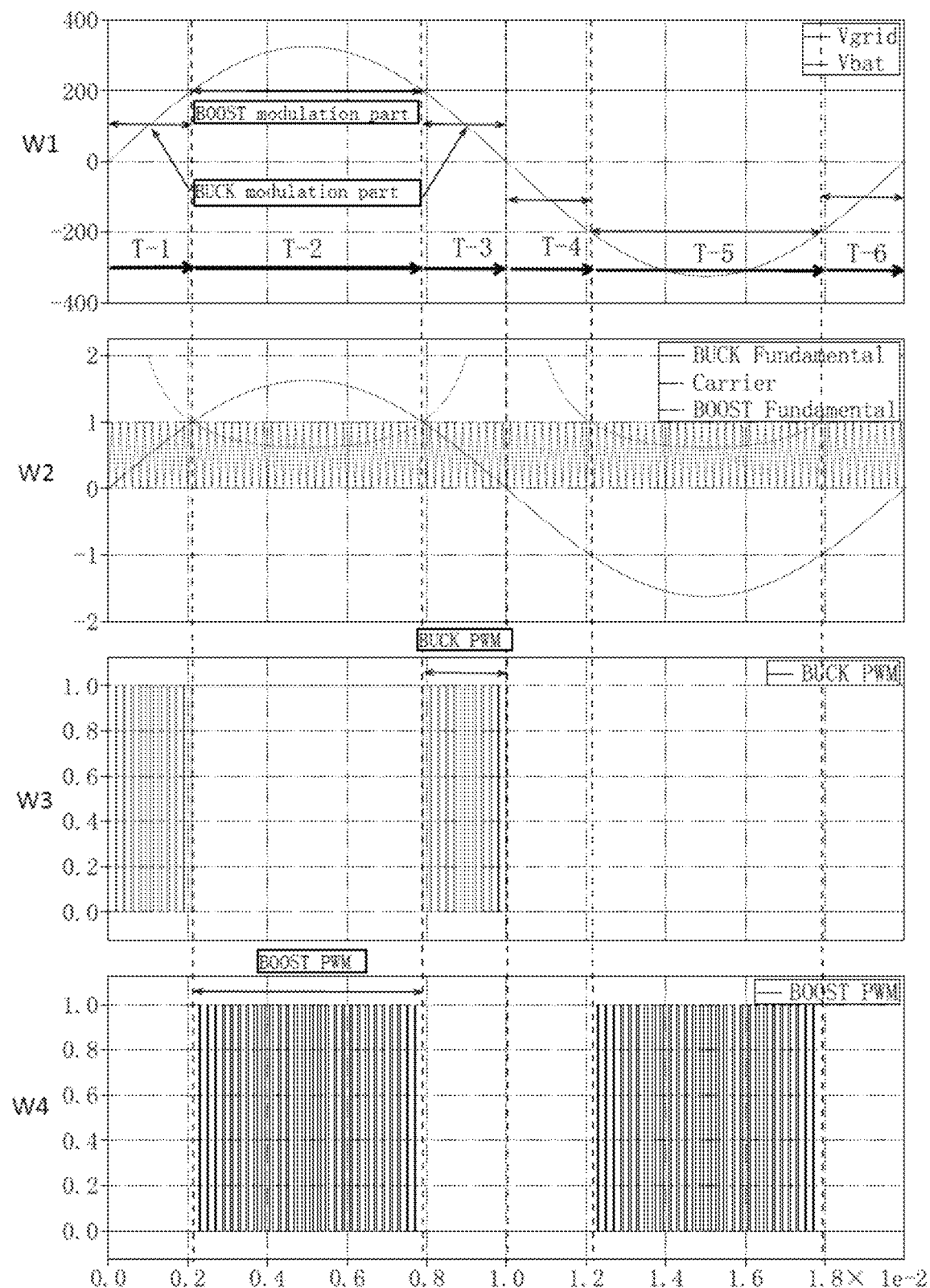
FIGS. 13A-C show exemplary key waveforms of step modulation (e.g., from a battery DC source to an AC grid) in connection with one or more embodiments of a presently disclosed single stage buck-boost inverter.
Figure 13B:
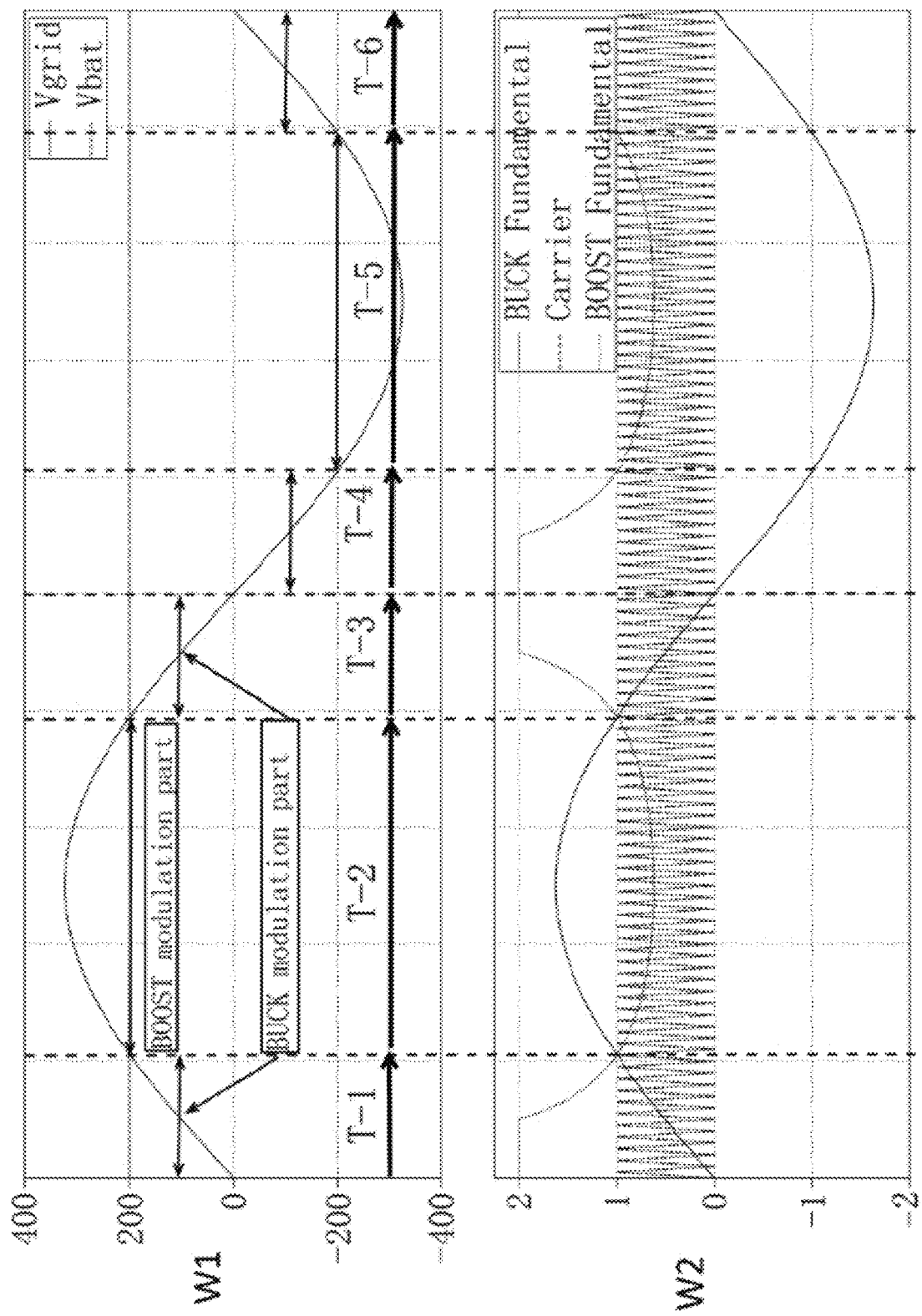
Figure 13C:
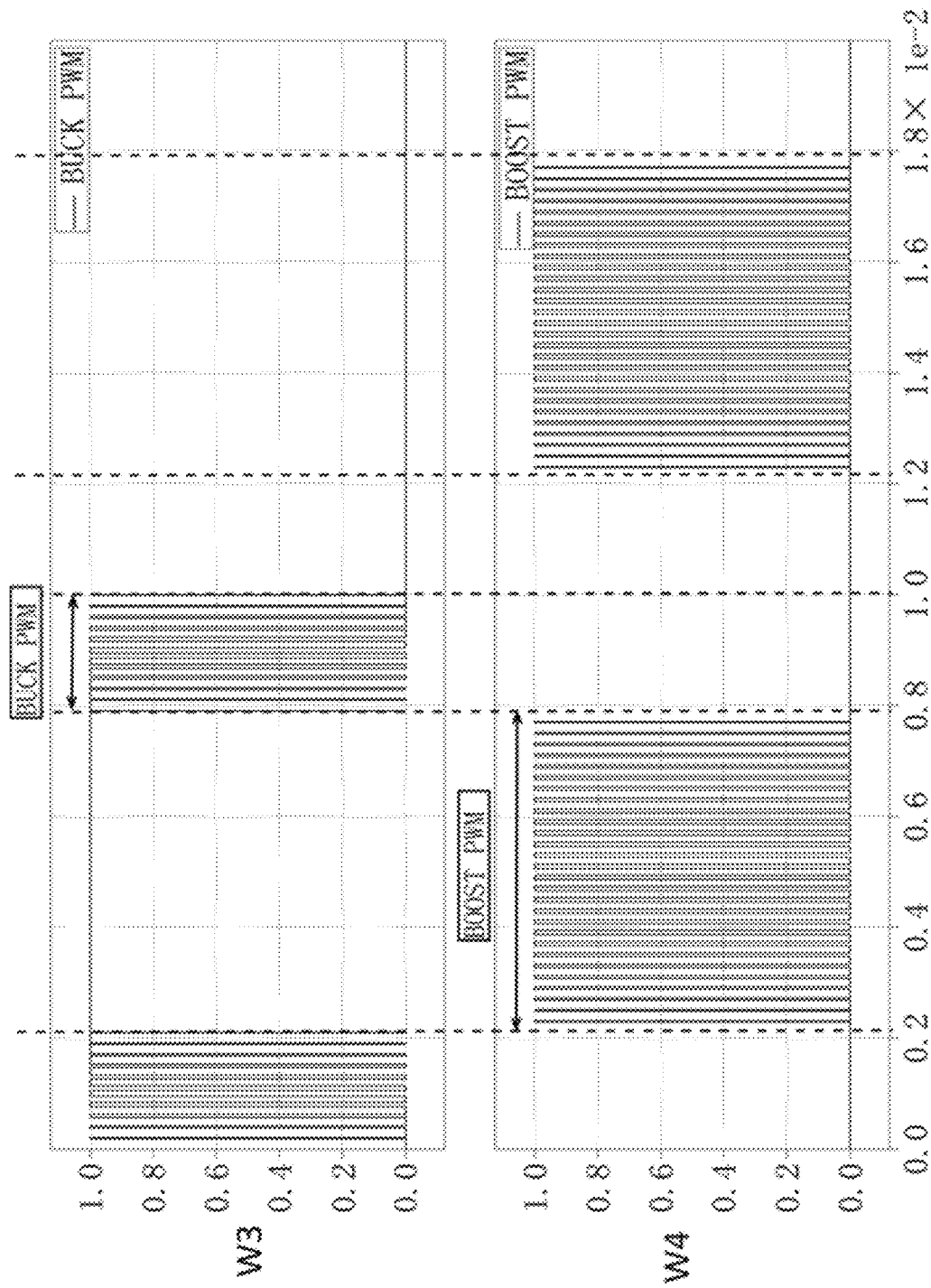

Operations:

FIGS. 13A-C illustrate operating waveforms generated during a power conversion operation that converts a DC voltage (of e.g., a battery) to an AC sinusoidal voltage during a discharge mode. The DC source (e.g., a battery) supplies a voltage of 200V DC, which is lower than the 240V AC voltage at an output terminal. In window W1, there are 6 steps of step modulation. W1 includes a marking of the 200V DC line of $V_{bat}$ in relation to the output voltage of $V_{grid}$, which is at 240V AC RMS voltage.

Window W2 shows a triangle waveform of a carrier signal, which is shown in comparison with, inter alia, the waveform of a boost fundamental signal (overlaid thereon), which, inter alia, compensates the carrier signal with an error signal created with a sinusoidal reference being compared with a feedback signal from, e.g., a grid.

Window W3 shows that when $V_{bat}>V_{grid}$, which occurs in the periods of T-1, T-3, T-4 and T-6, the respective drive signals are in a buck mode of an operation. Window W4 shows that when $V_{bat}<V_{grid}$, which occurs in the periods of T-2 and T-5, the respective drive signals are in a boost mode of an operation.

Referring to FIGS. 14 and 16, during each of periods T-1 and T-3 of a discharge mode cycle (which is a period where $V_{bat}>V_{grid}$ holds and the respective corresponding part of the AC sinusoidal is in its positive half cycle), inter alia, S1 and S6 are shorted; S3 is in a switching action (in accord with what a buck converter calls for) to enable a buck converter operation; S5 is in a switching action accordingly in achieving a bidirectional energy flow through coupled inductor T2; an output current flows through coupled inductor T2 in creating the respective corresponding part of the sinusoidal AC voltage crossing, e.g., a grid or an AC load; and the output current passes shorted switch S6 to establish a current path. During each of these two periods of a discharge mode cycle, all other switches, such as S2 and S4, are open.

Referring to FIGS. 17 and 19, during each of periods T-4 and T-6 of a discharge mode cycle (which is a period where $V_{bat}>V_{grid}$ holds and the respective corresponding part of the AC sinusoidal is in its negative half cycle), inter alia, S1 and S5 are shorted; S4 is in a switching action (in accord with what a buck converter calls for) to enable a buck converter operation; S6 is in a switching action accordingly in achieving a bidirectional energy flow through coupled inductor T3; an output current flows through coupled inductor T3 in creating a corresponding negative part of sinusoidal AC voltage crossing, e.g., a grid or an AC load; and the output current passes shorted switch S5 to establish a current path. During these two periods of a discharge mode cycle, all other switches, such as S2 and S3, are open.

As a skilled artisan readily appreciates, the respective operations of the period group of T-4 and T-6 mirrors the respective operations of the period group of T-1 and T-3. For both period groups, inter alia, alternate respective sets of switches are in respective corresponding switching actions to perform a respective buck converter operation while achieving a bidirectional energy flow through a respective coupled inductor, in creating alternate respective parts of a sinusoidal AC voltage crossing, e.g., a grid or an AC load.

Referring to FIG. 15, during period T-2 of a discharge mode cycle (which is a period where $V_{bat}<V_{grid}$ holds and the respective corresponding center part of the AC sinusoidal is in its positive half cycle), inter alia, S3 and S6 are shorted; S2 is in a switching action and working in concert with coupled inductor T1 (in accord with what a boost converter calls for) so as to enable a boost converter operation as well as enable S1 to receive (flow) reactive power by being, e.g., in a complementary switching action (i.e., complementary to the switching action of S2); an output current flows through coupled inductor T2 in creating the corresponding positive center part of a sinusoidal AC voltage crossing, e.g., a grid or an AC load; and the output current passes shorted switch S6 to establish a current path. During this period of a discharge mode cycle, all other switches, such as S4 and S5, are open.

Referring to FIG. 18, during period T-5 of a discharge mode cycle (which is a period where $V_{bat}<V_{grid}$ holds and the respective corresponding part of the AC sinusoidal is in its negative half cycle), inter alia, S4 and S5 are shorted; S2 is in a switching action and working in concert with coupled inductor T1 (in accord with what a boost converter calls for) to enable a boost converter operation as well as enable S1 to receive (flow) reactive power by being, e.g., in a complementary switching action (i.e., complementary to the switching action of S2); an output current flows through coupled inductor T3 in creating the corresponding negative center part of a sinusoidal AC voltage crossing, e.g., a grid or an AC load. and the current passes shorted switch S5 to establish a current path. During this period of a discharge mode cycle, all other switches, such as S3 and S6, are open.

As a skilled artisan readily appreciate, the respective operation of period T-2 mirrors the respective operation of the period T-5. For both periods, inter alia, S2 is in a switching action and working in concert with coupled inductor T1 to perform a boost converter operation and enable a reactive power flow through S1, while alternate respective sets of switches are either shorted or open accordingly to establish alternate respective current paths, in creating alternate respective center parts of a sinusoidal AC voltage crossing, e.g., a grid or an AC load.

What is claimed is:

1. An DC-AC inverter apparatus comprising:
   one set of pairs of terminals, having:
      one pair of AC output terminals configured to be coupled to an AC load; and
      one or more pairs of DC input terminals, each configured to be coupled to a respective DC power source across a respective pair of output terminals thereof; and
   one set of at least two bidirectional converter cells coupled to both the pair of output terminals and the one or more pairs of input terminals, each of the set of converter cells coupled to one another, each of the set of converter cells configured to be capable of performing one or more respective voltage conversion operations of a first set of operations of a boost conversion operation and a buck conversion operation and capable of performing one or more respective path-forming operations of a second set of operations of a short-circuit operation and an open-circuit operation, each of the set of converter cells configured to selectively perform one operation of the respective first and second sets of operations, each of the set of converter cells configured to realize bidirectional flow energy in terms of flowing energy both in an incoming direction and in an outgoing direction during each selected performing of one respective voltage conversion operation thereof; and
   wherein the set of converter cells are configured to work in concert with each other so as to generate an AC voltage, of a pre-defined AC voltage waveform of low-frequency (LF), across the pair of AC output terminals, the pre-defined AC voltage waveform configured to be over a series of consecutive time intervals pre-divided based on, for each time interval thereof,
   a respective first parameter derived from whether or not respective AC voltage values of a respective AC waveform portion of the pre-defined AC waveform over the respective time interval are of a respective uniform polarity of two opposite polarities, and
   a respective second parameter derived from whether or not respective absolute values of the respective AC voltages of the respective AC waveform portion are uniformly above or below a respective DC voltage of a respective DC power source which the set of converter cells receive, during the respective time interval, as a respective DC source used for generating the respective AC waveform portion, from a respective pair of input terminals, coupled to the respective DC power source, of the one or more pairs of input terminals; and
   wherein the set of converter cells are adaptively configured to perform a process of step modulation where, during and for each of the pre-divided time intervals, in converting the respective DC voltage, in a single stage, to a respective AC voltage, of the respective AC waveform portion, across the pair of output terminals, at least one respective converter cell of the set of converter cells is each selected and adaptively configured to receive the respective DC voltage and perform one respective voltage conversion operation thereof, in accord with, and depending upon, a respective value of the respective second parameter, and the respective remaining one or more converter cells of the set of the converter cells are each adaptively configured to perform, in forming a respective current path across the pair of output terminals, one respective path-forming operation thereof, in accord with, and depending upon, a respective value of the respective first parameter.

2. The DC-AC inverter apparatus of claim 1, wherein the set of converter cells consists of:

a subset of one or more boost converter cells each configured to be capable of performing only a boost conversion operation as the single respective voltage conversion operation of the respective converter cell; and a subset of one or more buck converter cells each configured to be capable of performing only a buck conversion operation as the single respective voltage conversion operation of the respective converter cell; and wherein for the process of step modulation, during and for each time interval of the pre-divided time intervals where the respective value of the respective first parameter indicates a use of a boost conversion operation, at least one respective converter cell of the subset of one or more boost converter cells is each selected, and adaptively configured to perform the respective voltage conversion operation thereof, and during and for each time interval of the pre-divided time intervals where the respective value of the respective first parameter indicates a use of a buck conversion operation, at least one respective converter cell of the subset of one or more buck converter cells is each selected, and adaptively configured to perform the respective voltage conversion operation thereof.

3. The DC-AC inverter apparatus of claim 2, wherein the set of converter cells is coupled to the one or more pairs of input terminals through each pair thereof being coupled to one or more respective boost converter cells of the subset of one or more boost converter cells; and wherein the set of converter cells is coupled to the pair of output terminals through the pair of output terminals being coupled to at least one respective buck converter cell of the subset of one or more buck converter cells.

4. The DC-AC inverter apparatus of claim 2, wherein for each converter cell of the set of converter cells, the respective converter cell is further configured to have a respective switch set of at least two high-frequency (HF) switches, and perform, during each time interval of the pre-divided time intervals where the respective converter cell is selected to perform the respective voltage conversion operation, the respective voltage conversion operation through respective HF switching actions of the at least two HF switches, each said respective HF switching action controlled by at least one of a respective set of one or more HF drive signals configured, for the respective converter cell, to realize the respective flowing of energy in both the incoming direction and the outgoing direction during the respective performing of the respective voltage conversion operation.

5. The DC-AC inverter apparatus of claim 4, wherein for each converter cell of the set of converter cells, the respective converter cell is further configured, in making the respective energy flow bidirectional during each respective said performing of the respective voltage conversion operation, to have at least a respective first HF switch, of the respective switch set, so configured, for the respective converter cell, to realize a respective discharging, in the respective outgoing direction, of energy, and have at least a respective second HF switch, of the respective switch set, so configured, for the respective converter cell, to realize a respective receiving, in the respective incoming direction, of energy.

6. The DC-AC inverter apparatus of claim 5, wherein for each converter cell of the set of converter cells, the respective converter cell is further configured to have a respective coupled inductor coupled to both the at least respective first and second HF switches, the respective coupled inductor configured, for the respective converter cell, to realize the respective flowing of energy bidirectional during each respective said performing of the respective voltage conversion operation.

7. The DC-AC inverter apparatus of claim 5, wherein for each converter cell of the set of converter cells, the at least respective second HF switch is configured to be shorted and the at least respective first HF switch is configured to be opened, in performing a respective short-circuit operation during each time interval of the pre-divided time intervals where the respective short-circuit operation is selected to be performed as a respective path-forming operation.

8. The DC-AC inverter apparatus of claim 5, wherein for each converter cell of the set of converter cells, both the at least first and second respective HF switches are configured to be opened, in performing a respective open-circuit operation during each time interval of the pre-divided time intervals where the respective open-circuit operation is selected to be performed as a respective path-forming operation.

9. The DC-AC inverter apparatus of claim 1, wherein the pre-defined AC voltage waveform of LF, for the AC voltage generated across the pair of AC output terminals, comprises a sinusoidal waveform of LF.

10. The DC-AC inverter apparatus of claim 1, wherein for each converter cell of the set of converter cells, for each of the respective one or more voltage conversion operations which the respective converter cell is configured to be capable of performing, pulse-width-modulation (PWM) is used to implement the respective voltage conversion operation in accord with a respective waveform portion of the predefined AC waveform for a respective time interval of the pre-divided time intervals during which the respective converter cell is selected to perform the respective voltage conversion operation.

11. The DC-AC inverter apparatus of claim 1, wherein the set of bidirectional converter cells is coupled to the pair of output terminals through a current selector means coupled there-between, the current selector means configured to receive, from the set of bidirectional converter cells, an incoming current, and selectively output one of two alternate outgoing currents flowing across the pair of output terminals in respective opposite directions before reaching the ground.

12. The DC-AC inverter apparatus of claim 11, wherein the current selector means comprises a full-bridge configuration.

* * * * *